US012795180B2

(12) United States Patent
Yuan et al.

(10) Patent No.: US 12,795,180 B2

(45) Date of Patent: Nov. 10, 2026

(54) LIVE STREAMING INTERACTION METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yongqing Yuan, Shenzhen (CN); Fang Zou, Shenzhen (CN); Liang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/292,499

(22) Filed: Aug. 6, 2025

(65) Prior Publication Data

US 2025/0365454 A1 Nov. 27, 2025

Related U.S. Application Data

(63) Continuation of application No. PCT/CN2024/094907, filed on May 23, 2024.

(30) Foreign Application Priority Data

Jul. 25, 2023 (CN) ........................ 202310917213.X

(51) Int. Cl.
*H04N 21/2187* (2011.01)
*H04N 21/472* (2011.01)

(52) U.S. Cl.
CPC ... *H04N 21/2187* (2013.01); *H04N 21/47205* (2013.01)

(58) Field of Classification Search
CPC ......... H04N 21/2187; H04N 21/47205; H04N 21/431; H04N 21/4788; H04N 21/81; H04N 21/8352; H04N 21/4312; H04N 21/816
See application file for complete search history.

(56) References Cited

U.S. PATENT DOCUMENTS 10,693,669 B2 * 6/2020 Dave ...................... H04N 7/157
11,375,288 B1 * 6/2022 Buckhouse ........ G06Q 30/0252
(Continued)

FOREIGN PATENT DOCUMENTS

CN 105635745 A 6/2016
CN 110581947 A 12/2019
(Continued)

OTHER PUBLICATIONS

The World Intellectual Property Organization (WIPO) International Search Report for PCT/CN2024/094907 Aug. 21, 2024 5 Pages (including translation).
(Continued)

*Primary Examiner* — John R Schnurr
(74) *Attorney, Agent, or Firm* — ANOVA LAW GROUP, PLLC

(57) ABSTRACT

A live streaming interaction method, performed by a first client, includes: presenting, in response to a picture obtaining operation triggered by a first object on a live streaming interface, a corresponding interactive picture in the live streaming interface, the interactive picture being generated based on a live streaming picture in the live streaming interface; transmitting the interactive picture to a second client via a signature invitation request in response to a signature invitation operation triggered by the first object based on the interactive picture, so that a second object logged into the second client performs signature interaction with the first object based on the interactive picture; and
(Continued)

receiving and presenting a signature result for the interactive picture, the signature result being generated through the signature interaction based on the interactive picture.

20 Claims, 18 Drawing Sheets

(56) References Cited

U.S. PATENT DOCUMENTS

| | | | | |
|---|---|---|---|---|
| 11,778,278 | B2 * | 10/2023 | Tashiro | H04N 21/2187 725/23 |
| 2008/0088718 | A1 * | 4/2008 | Cazier | H04N 5/272 348/E5.058 |
| 2013/0132230 | A1 * | 5/2013 | Gibson | H04L 67/02 709/204 |
| 2016/0171524 | A1 * | 6/2016 | Waters | H04L 63/107 705/14.26 |
| 2018/0351756 | A1 * | 12/2018 | Dave | H04N 21/4788 |
| 2019/0377416 | A1 | 12/2019 | Alexander | |
| 2020/0128286 | A1 | 4/2020 | Anders et al. | |
| 2021/0006864 | A1 | 1/2021 | Xu et al. | |
| 2021/0076107 | A1 * | 3/2021 | Quek | H04N 21/812 |
| 2023/0209145 | A1 * | 6/2023 | Tashiro | H04N 21/2187 725/23 |
| 2023/0410224 | A1 * | 12/2023 | Yeh | G06Q 10/44 |
| 2024/0129585 | A1 | 4/2024 | Zhang et al. | |
| 2024/0340323 | A1 * | 10/2024 | Kaestner | H04N 5/265 |
| 2025/0209705 | A1 * | 6/2025 | Ren | G06T 11/60 |

FOREIGN PATENT DOCUMENTS

| | | | | |
|---|---|---|---|---|
| CN | 111897483 | A | 11/2020 | |
| CN | 112492330 | A | 3/2021 | |
| CN | 114339039 | A | 4/2022 | |
| CN | 114501102 | A | 5/2022 | |
| CN | 115529498 | A | 12/2022 | |
| CN | 115623227 | A | 1/2023 | |
| CN | 115756256 | A | 3/2023 | |
| WO | WO-2023090962 | A1 * | 5/2023 | G06Q 20/36 |
| WO | WO-2024183448 | A1 * | 9/2024 | G06F 3/011 |

OTHER PUBLICATIONS

China National Intellectual Property Administration (CNIPA) Office Action 1 for Application No. 202310917213.X Aug. 22, 2026 12 Pages (including translation).

* cited by examiner

LIVE STREAMING INTERACTION METHOD, ELECTRONIC DEVICE, AND STORAGE MEDIUM

CROSS-REFERENCES TO RELATED APPLICATIONS

The present disclosure is a continuation application of PCT Patent Application No. PCT/CN2024/094907, filed on May 23, 2024, which claims priority to Chinese Patent Application No. 202310917213.X, filed on Jul. 25, 2023, all which is incorporated by reference in their entirety.

FIELD OF THE TECHNOLOGY

The present disclosure relates to the field of computer technologies and, in particular, to the field of virtual reality technologies, and provides a live streaming interaction method and apparatus, an electronic device, and a storage medium.

BACKGROUND OF THE DISCLOSURE

With the application and development of network live streaming technologies, various live streaming platforms have begun to offer diverse types of live streaming content. To enhance the appeal of live streaming content to objects (or viewers), and increase interactivity, entertainment value, and sense of presence, virtual reality (VR) technology has gradually been integrated into the live streaming.

VR live streaming is a combination of VR and live streaming. The key difference between conventional live streaming and VR live streaming is that the VR live streaming allows viewers to immerse in the scene in presence, and experience in real time form from all angles. However, as an emerging live streaming technology, VR live streaming currently offers a monotonous/limited display modes in a live streaming room, which fails to meet the growing demand for personalized and convenient interactive experiences.

SUMMARY

One embodiment of the present disclosure provides a live streaming interaction method performed by a first client. The method includes: presenting, in response to a picture obtaining operation triggered by a first object on a live streaming interface, a corresponding interactive picture in the live streaming interface, the interactive picture being generated based on a live streaming picture in the live streaming interface; transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

Another embodiment of the present disclosure provides an electronic device. The electronic device includes one or more processors and a memory containing a computer program that, when being executed, causes the one or more processors to perform: presenting, in response to a picture obtaining operation triggered by a first object on a live streaming interface, a corresponding interactive picture in the live streaming interface, the interactive picture being generated based on a live streaming picture in the live streaming interface; transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

Another embodiment of the present disclosure provides a non-transitory computer-readable storage medium containing a computer program that, when being executed, causes at least one processor to perform: presenting, in response to a picture obtaining operation triggered by a first object on a live streaming interface, a corresponding interactive picture in the live streaming interface, the interactive picture being generated based on a live streaming picture in the live streaming interface; transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

Other features and advantages of this application are described in the following specification, and partially become apparent from the specification or may be learned from implementation of this application. Objectives and other advantages of this application may be implemented and obtained through structures particularly pointed out in the specification, claims, and accompanying drawings.

BRIEF DESCRIPTION OF THE DRAWINGS

The accompanying drawings described herein are used to provide a further understanding of the present disclosure, and form part of the present disclosure. Exemplary embodiments of the present disclosure and descriptions thereof are used to explain the present disclosure, and do not constitute any inappropriate limitation to the present disclosure. In the accompanying drawings.

DESCRIPTION OF EMBODIMENTS

Figure 1:
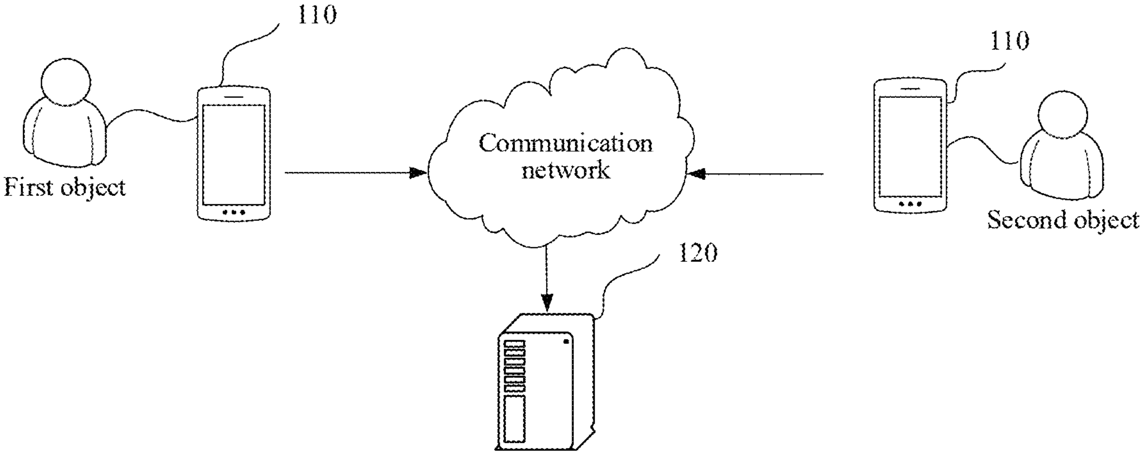
FIG. 1 is an exemplary schematic diagram of an application scene according to an embodiment of the present disclosure.

To make objectives, technical solutions, and advantages of embodiments of the present disclosure clearer, the following clearly and completely describes the technical solutions of the present disclosure with reference to the accompanying drawings in the embodiments of the present disclosure. It is clear that the described embodiments are some rather than all of the embodiments of the technical solutions of the present disclosure. All other embodiments obtained by a person of ordinary skill in the art based on embodiments in the present disclosure file without creative efforts shall fall within the protection scope of the technical solutions of the present disclosure.

VR live streaming is a combination of VR and live streaming. A difference between the VR live streaming and a common news live broadcast and a common Spring Festival live broadcast lies in that the VR live streaming has three features: panorama, 3-dimension (3D), and interaction. A 360-degree panorama photographing device is configured to capture an ultra-clear picture from multiple angles. Each frame of picture is a 360-degree panorama, and a viewer may select any angle from up, down, left, and right angles, to experience a vivid immersion, so that the viewer can be personally on the scene, and experience is omni-directional in real time.

A VR device may be an independent VR display device integrated with a control function, or may be a combination of a VR display device and an interaction controller. When combined, the VR display device is configured to close visual and auditory senses of a human to the outside, and guide an object to generate a feeling of being in a virtual environment. A display principle thereof is that a left eye screen and a right eye screen respectively display images of the left eye and the right eye, and the human eye generates a three-dimensional feeling in the mind after obtaining such information with difference, for example, a VR head mounted display device, referred to as a VR HMD for short. The interaction controller, such as a VR handheld controller, is configured to implement an interaction function with the VR display device, so that an effect of performing a related operation in a virtual environment can be achieved, and an object has a more immersive experience. Based on the VR handheld controller, the object may select a menu and control movement, action execution, and the like of an object model in a virtual scene.

An interactive picture is generated based on a live streaming picture in a live streaming interface and is a picture for implementing interaction between a first object and a second object. Specifically, the interactive picture may be obtained in a manner such as screenshot or photographing of the live streaming picture, and may be an entire live streaming picture at a moment in a live streaming room, or may be a part of a live streaming picture at a moment.

Signature interaction is an interaction manner, which is specifically a live streaming interaction manner between a first object viewing a live stream and a second object associated with the live streaming. Specifically, the first object initiates a signature invitation to the second object based on an interactive picture, and the second object may sign on the interactive picture (where the signature in this specification refers to signing for certain content according to an idea of the second object or a request of the first object, and is not limited to blessings, a name of the first object, and the like), and feed back a signature result to the first object.

Signature information is, in the present disclosure, information signed by the second object on the interactive picture based on a request when the first object initiates signature interaction with the second object, including, but not limited to, name information of the first object and a persuasive language about requesting from the first object for signing by the second object (such as a blessing or a postscript).

A writing mode is a signing manner used by the second object when signing on the interactive picture, and includes, but is not limited to, air gesture signing, touchpad signing, virtual keyboard signing, and the like.

With the continuous development of electronic technologies and network technologies, a client that integrates functions such as video live streaming, online gaming, online movie and television, and group chat is widely applied to an electronic device such as a personal computer, a tablet computer, and a mobile phone. An object not only views, by using an online live streaming room of the client, a live video or audio program published by a live streamer object, but also applies to an operator of the online live streaming room to become a live streamer object.

Specifically, the live streamer object generally refers to a video or audio content publisher. After applying to become a live streaming object, the object may log in to a live streaming room allocated thereto by the operator using a live streamer account, so that performance, knowledge announcement, commodity introduction, and the like may be performed in the live streaming room.

Currently, live streaming may be divided into two manners: conventional live streaming and VR live streaming. The conventional live streaming may alternatively be referred to as non-VR live streaming in the present disclosure. During live streaming, a live streamer interacts with viewers mainly by using a bullet screen or by using a video/voice call. Currently, display manners in a live streaming room are relatively monotonous. The manners cannot meet increasing personalized and convenient live streaming interaction requirements of people.

Therefore, how to enrich information interaction manners of live streaming and enhance live streaming interactivity is to be urgently resolved.

In view of this, embodiments of the present disclosure provide a live streaming interaction method and apparatus, an electronic device, and a storage medium. In the present disclosure, in a process of viewing a live stream, a first object may obtain an interactive picture generated based on a live streaming interface by using a picture obtaining operation. Based on this, a signature invitation request is initiated to a second client. Further, after the second client receives the signature invitation request, a second object logged into the second client may trigger a signature interaction operation based on corresponding interaction prompt information, and performs signature interaction with the first object by using the interactive picture. After obtaining a signature result, the second object may return the signature result to the first client through the second client for viewing by triggering an interaction feedback operation, thereby implementing a closed-loop procedure of the signature interaction. The present disclosure provides a new live streaming room interaction form, thereby enriching information interaction manners in a VR live streaming room, satisfying a personalized live streaming interaction requirement between objects, and improving interaction interestingness. In addition, the foregoing signature interaction is implemented in a live streaming process, thereby effectively reducing a frequency that an object logs in to and logs out of a live streaming room, and improving live streaming pressure on a server to some extent. The present disclosure provides a new manner of signature-based live streaming interaction, enhancing live streaming interactivity and interestingness.

Preferred embodiments of the present disclosure are described below with reference to the accompanying drawings. The preferred embodiments described herein are merely configured for illustrating and explaining the present disclosure and are not intended to limit the present disclosure. In addition, the embodiments and features of the embodiments in the present disclosure may be combined with each other without conflict.

FIG. 1 shows a schematic diagram of an application scene according to an embodiment of the present disclosure. The diagram of application scene includes two terminal devices 110 and one server 120.

In this embodiment of the present disclosure, the terminal device 110 includes, but is not limited to, a mobile phone, a tablet computer, a notebook computer, a desktop computer, an e-book reader, an intelligent voice interaction device, an intelligent household appliance, an in-vehicle terminal, a personal computer (PC), and the like. A live streaming interaction-related client may be installed on the terminal device. The client may be software (such as a browser, short video software, video software, live streaming software, or shopping software), or a web page, an applet, or the like. The server 120 is a back-end server corresponding to the software or web page, applet, or the like, or a server specifically configured to perform live streaming interaction. This is not specifically limited in the present disclosure. The server 120 may be an independent physical server, a server cluster or distributed system including a plurality of physical servers, or a cloud server providing a basic cloud computing service such as a cloud service, a cloud database, cloud computing, a cloud function, cloud storage, a network service, cloud communication, a middleware service, a domain name service, a security service, a content delivery network (CDN), or a big data and artificial intelligence platform.

A live streaming interaction method according to the embodiments of the present disclosure may be performed by an electronic device. The electronic device may be the terminal device 110 or the server 120. To be specific, the method may be performed by the terminal device 110 or the server 120 alone, or may be performed jointly by the terminal device 110 and the server 120. For example, when being performed jointly by the terminal device 110 and the server 120, the present disclosure may relate to a plurality of terminal devices 110, such as a terminal device 110 provided with a first client to which a first object logs in, and a terminal device 110 provided with a second client to which a second object logs in. Specifically, the first object may trigger a picture obtaining operation on a live streaming interface by using the first client on the terminal device 110, and the terminal device 110 presents a corresponding interactive picture in the live streaming interface in response to the picture obtaining operation of the first object. After obtaining the interactive picture, the first object may initiate, based on the interactive picture, a signature invitation request to the second client to which the second object logs in by using the first client to which the first object logs in. The terminal device 110 transmits a corresponding signature invitation request to the server 120 in response to a signature invitation operation triggered by the first object based on the interactive picture. After determining a to-be-interacted second object based on the signature invitation request, the server 120 transmits, by using the terminal device 110, the signature invitation request to the second client to which the second object logs in. Further, the terminal device 110 obtains a signature result generated based on the interactive picture in response to a signature interaction operation triggered by the second object based on the interaction prompt information. Then, the terminal device 110 transmits an interaction feedback request to the server 120 in response to an interaction feedback operation triggered by the second object. The server 120 transmits a signature result of the interactive picture to the first client by using the terminal device 110. The terminal device 110 presents the signature result for the interactive picture to the first object by using the first client.

In an exemplary embodiment, the terminal device 110 may communicate with the server 120 through a communication network.

In an exemplary embodiment, the communication network is a wired or wireless network.

FIG. 1 is merely an example for description. Actually, quantities of terminal devices and servers are not limited, and are not specifically limited in this embodiment of the present disclosure.

In this embodiment of the present disclosure, when there are a plurality of servers, the plurality of servers may form a blockchain, and the servers are nodes on the blockchain. In the live streaming interaction method disclosed in this embodiment of the present disclosure, live streaming data and interaction data involved may be stored on a blockchain, such as an interactive picture, signature information, and a signature result.

In addition, this embodiment of the present disclosure may be applied to various scenes, including but not limited to, cloud technology, artificial intelligence, intelligent transportation, and assisted driving.

The following describes the live streaming interaction method provided in exemplary embodiments of the present disclosure with reference to the foregoing application scene and the drawings. The foregoing application scene is illustrated to facilitate understanding of the spirit and principles of the present disclosure, and the implementations of the present disclosure are not limited in this aspect.

Figure 2:
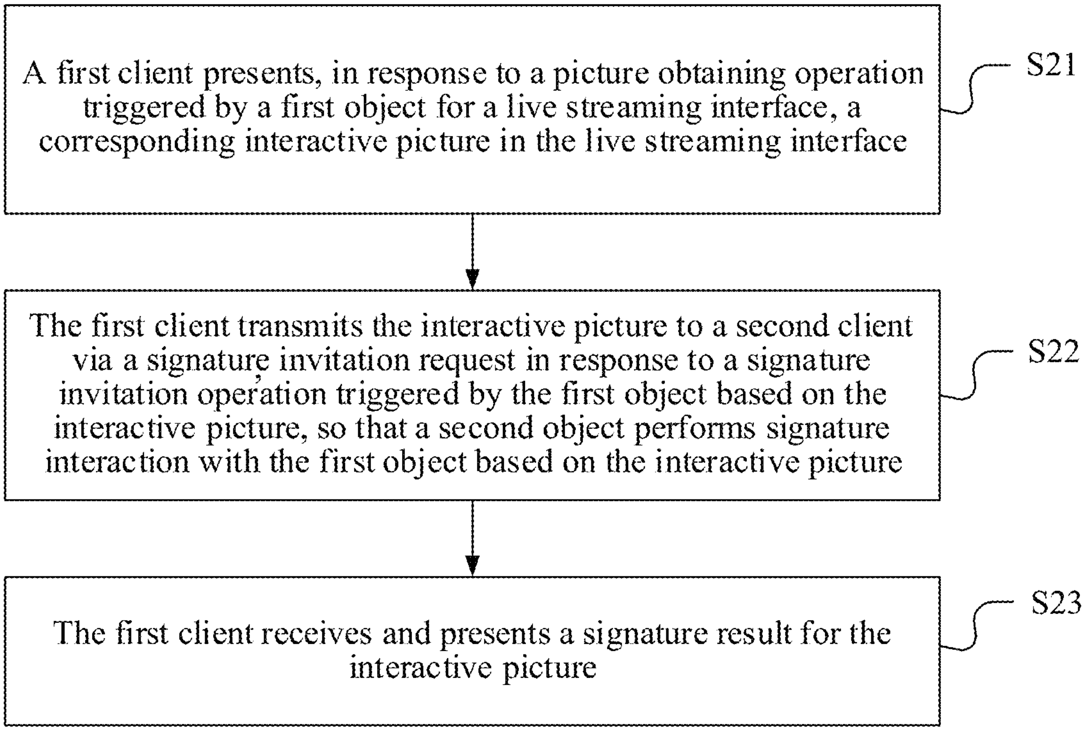
FIG. 2 is an implementation flowchart of a first live streaming interaction method according to an embodiment of the present disclosure.

FIG. 2 shows an implementation flowchart of a first live streaming interaction method according to an embodiment of the present disclosure. Taking a first client as an execution subject as an example, a specific implementation procedure of the method includes the following S21 to S23.

S21: A first client presents, in response to a picture obtaining operation triggered by a first object on a live streaming interface, a corresponding interactive picture in the live streaming interface.

The first client is a client to which the first object logs in, and may be a VR client, or may be a common client (a non-VR client such as a mobile phone client or a PC client).

The interactive picture is generated based on a live streaming picture in a live streaming interface and is a picture for implementing interaction between a first object and a second object. Specifically, the interactive picture may be obtained in a manner such as screenshot or photographing of the live streaming picture, and may be an entire live streaming picture at a moment in a live streaming room, or may be a part of a live streaming picture at a moment.

In this embodiment of the present disclosure, the live streaming interaction method may be applied to a common live streaming scene, or may be applied to a VR live streaming scene. In different live streaming scenes, the picture obtaining operation may be the same or may be different. This is not specifically limited in the present disclosure.

In addition, the interactive picture in this embodiment of the present disclosure may be specifically an entire live streaming picture at a moment in a live streaming room currently viewed by the first object, or may be a part of a live streaming picture at a moment. Specifically, the "a moment" may be a moment at which the first object triggers the picture obtaining operation, or may be a moment at which the first client responds to the picture obtaining operation, or may be a moment specified by the first object. This is not specifically limited in the present disclosure.

The following describes a process of obtaining an interactive picture in a VR live streaming scene and a non-VR live streaming scene.

(1) In the VR live streaming scene, the live streaming interface is a VR live streaming interface, what the first object views is a 3D scene, and the picture obtaining operation is a photographing operation. The first object may photograph, by using a picture obtaining operation, a live streaming picture currently played in a live streaming interface, to obtain an interactive picture for signature interaction.

To be specific, when the live streaming interface is a VR live streaming interface, the picture obtaining operation may be a photographing operation, and the interactive picture is obtained by photographing a live streaming picture in the live streaming interface. In this scene, an exemplary implementation of S21 includes operations S211 to S213.

S211: The first client determines that a preset photographing gesture of the first object is recognized, and determines, according to the preset photographing gesture, a picture size and a picture region that are set by the first object.

S212: The first client presents an interactive picture determined based on the picture size and the picture region in the live streaming interface in response to the photographing operation triggered by the first object.

In this embodiment of the present disclosure, in the VR live streaming scene, the first client may be a VR client, and the first object may invoke a photographing function of the VR client by using a preset photographing gesture. After recognizing the preset photographing gesture of the first object by using a camera on a VR device (such as a VR HMD), the VR client determines, according to the gesture, a size of a picture to be photographed and a picture region.

In one embodiment, the preset photographing gesture may be any gesture specified in advance, such as a viewfinder frame gesture, a victory gesture, or an OK gesture. Specifically, the preset photographing gesture may be set flexibly according to an actual requirement. This is not specifically limited in this embodiment of the present disclosure.

Figure 3A:
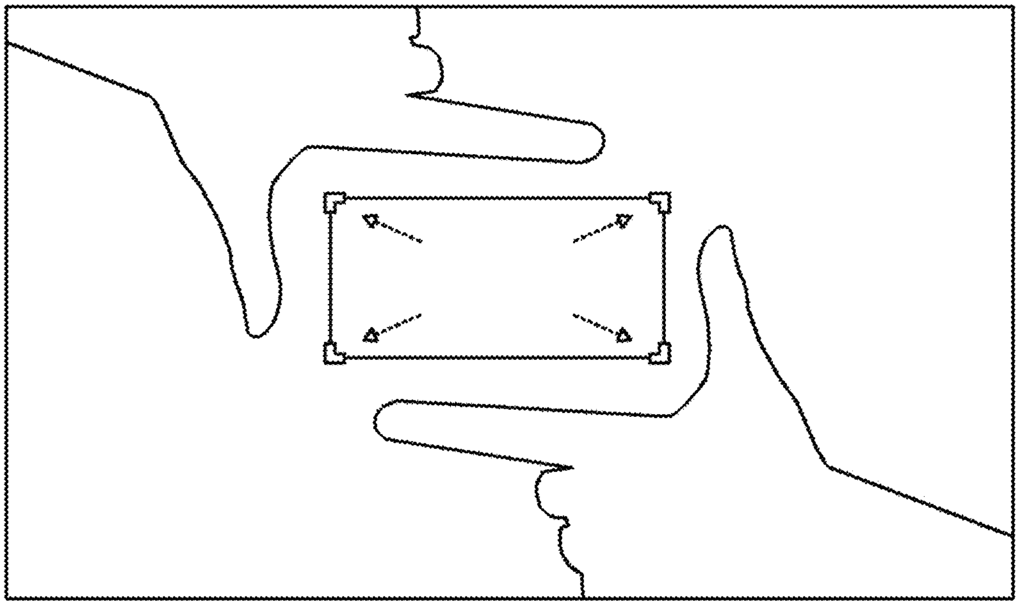
FIG. 3A is a schematic diagram of a viewfinder frame gesture according to an embodiment of the present disclosure.

In this embodiment of the present disclosure, an example in which the preset photographing gesture is a viewfinder frame gesture is used. FIG. 3A shows a schematic diagram of a viewfinder frame gesture according to an embodiment of the present disclosure. An interactive picture photographed based on the viewfinder frame gesture is a live streaming picture in a rectangular frame.

When the first object makes a viewfinder frame gesture, a photographing function may be recognized. In addition, the viewfinder frame gesture is adjusted, a picture size is defined according to a selected size of a viewfinder frame, and a picture region is selected by moving the viewfinder frame gesture.

For example, the first object may adjust, by moving left, right, up, down, or the like, a picture region to be set. To be specific, the picture region is selected by moving the viewfinder frame gesture. The first object may further adjust the set picture size by adjusting a distance between two hands in the viewfinder frame gesture. To be specific, the picture size is defined according to a gesture size of the first object. FIG.

3B shows a schematic diagram of another viewfinder frame gesture according to an embodiment of the present disclosure. By reducing a distance between two hands, a size of a viewfinder frame is reduced, and a size of a selected picture is set. A picture region is adjusted by moving the gesture left.

In this embodiment of the present disclosure, the first object may set a picture size and a picture region by adjusting the preset photographing gesture. After the setting is completed and a picture to be photographed is selected, a photographing operation may be triggered by using a target action, and a corresponding interactive picture is photographed based on the picture size and the picture region that are set by the first object.

The photographing operation may be triggered based on a specific action. A form of the specific action is not limited in this embodiment of the present disclosure, and may be, for example, a gesture action or a key action. The specific action is described in detail below.

Manner 1: The specific action is a gesture action.

In some embodiments, the specific action may alternatively be any preset gesture action. For example, the specific action is a press-down action. After setting a picture size and a picture region based on the viewfinder frame gesture, the first object may trigger an index finger press-back action while keeping the viewfinder frame gesture, indicating that a shutter is pressed down to take a picture.

Figure 4:
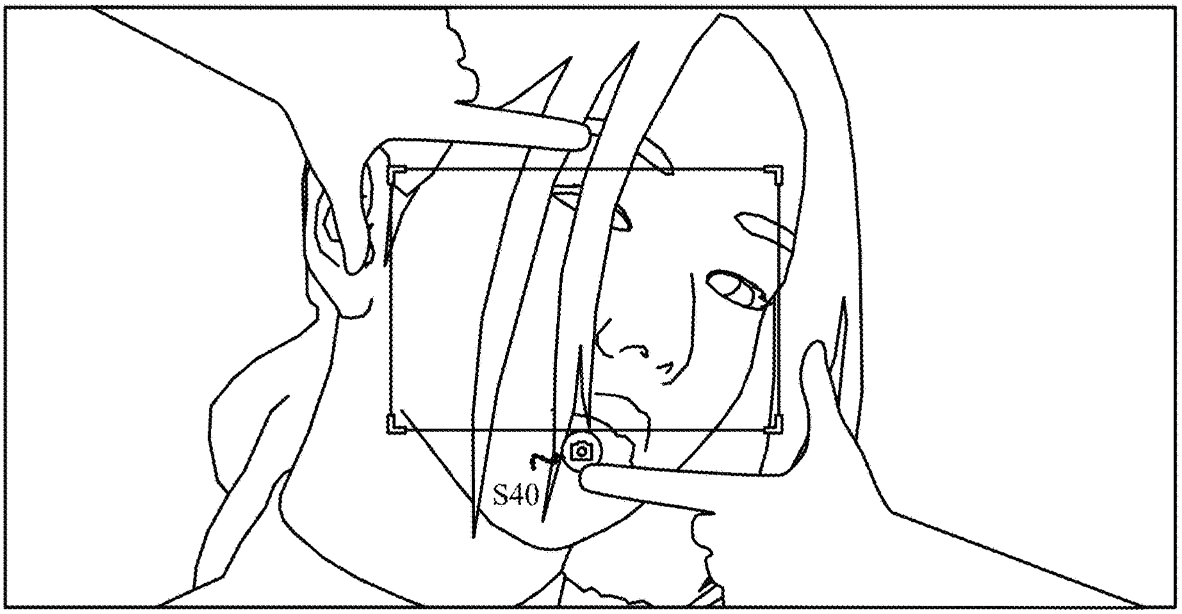
FIG. 4 is a schematic diagram of an execution process of a target action according to an embodiment of the present disclosure.

FIG. 4 shows a schematic diagram of an execution process of a specific action according to an embodiment of the present disclosure. As shown in FIG. 4, the first object may press back the specific action by using an index finger, to trigger a photographing operation, and present a prompt icon of a press-back state shown in S40, to photograph a live streaming picture in a current viewfinder frame, to obtain an interactive picture.

FIG. 4 shows an example in which an index finger presses back. In addition to the index finger, there may be one or more fingers, not limited to being of a left hand or a right hand.

In the foregoing implementation, the first object may completely photograph the interactive picture only by using a gesture instead of a VR handheld controller, so that the operation is more convenient.

Manner 2: The specific action is a key action.

In some embodiments, the specific action may alternatively be an action such as tapping/clicking or holding a key on the VR handheld controller (such as a grip or a handle). After setting a picture size and a picture region based on the viewfinder frame gesture, the first object may tap/click a grip key with an index finger while keeping the viewfinder frame gesture, indicating that a shutter is pressed down to take a picture.

Figure 3B:
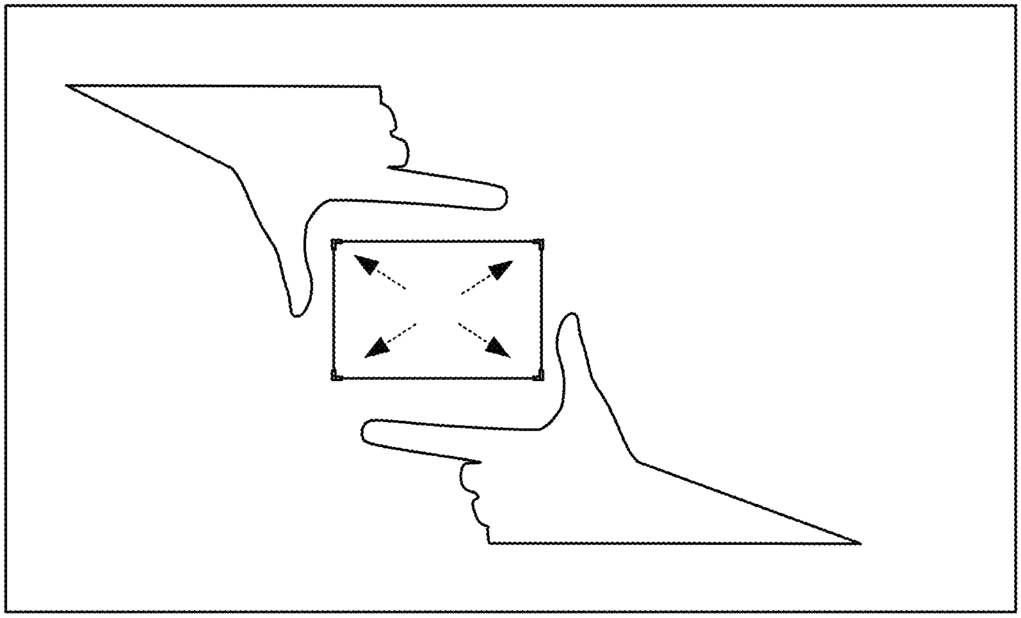
FIG. 3B is a schematic diagram of another viewfinder frame gesture according to an embodiment of the present disclosure.
Figure 5:
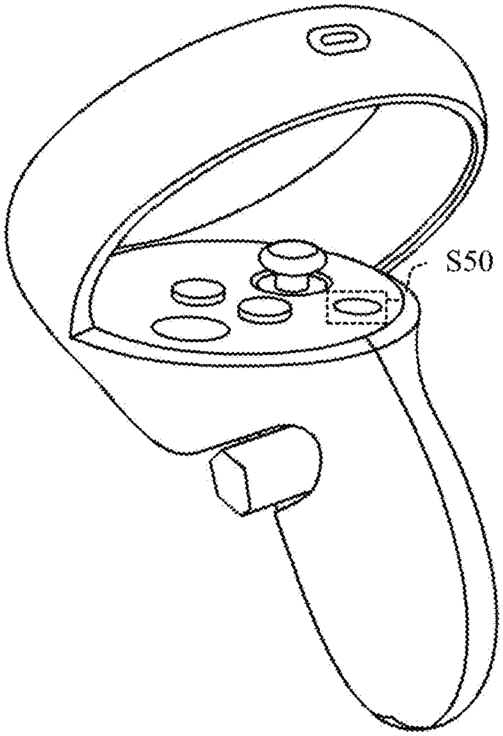
FIG. 5 is a schematic diagram of another execution process of a target action according to an embodiment of the present disclosure.

FIG. 5 shows a schematic diagram of an execution process of another specific action according to an embodiment of the present disclosure. Based on keeping the viewfinder frame gesture (as shown in FIG. 3A or FIG. 3B), the first object clicks/taps, with other fingers than a thumb and the index finger, the grip key shown in S50 on the grip to take a picture, to photograph a current live streaming picture, to obtain an interactive picture. Alternatively, based on keeping the viewfinder frame gesture, the index finger or the thumb clicks/taps the grip key shown in S50 on the grip to take a picture, to photograph a current live streaming picture, to obtain an interactive picture.

In the foregoing implementation, the first object may combine a gesture with the VR handheld controller, and confirm photographing by using the VR handheld controller after setting a picture region and a picture size based on the gesture, to complete photographing of the interactive picture. Based on using an existing device, the first object flexibly sets a photographing range by using the gesture, so that an operation is convenient and implementation logic is simpler.

In a VR live streaming scene, besides invoking a photographing function of the VR client by using the preset photographing gesture, the first object may further directly trigger the photographing function based on the VR handheld controller, for example, directly tap/click or hold the key on the grip (S50 shown in FIG. 5), to photograph a current live streaming picture.

In this manner, the first object does not need to set a size of a picture to be photographed or a picture region, and may directly photograph a complete live streaming picture, to obtain an interactive picture. The operation is more convenient.

The several photographing manners listed above may be applicable to a case where there is a handheld controller. To be specific, in a VR live streaming scene, the first object may wear a VR HMD (such as VR glasses or a VR helmet) to view a VR live stream, and may further hold a VR handheld controller with a hand to trigger a photographing operation. In addition, the foregoing listed manner of triggering photographing by pressing back with an index finger may alternatively be applicable to a case where there is no handheld controller.

The foregoing is merely a simple example, and is not limited to the index finger. When the foregoing action is triggered by using one or more other fingers, or another object, the photographing operation may be triggered. This is not specifically limited in this specification.

Alternatively, in addition to the press-down action listed above, the first object may trigger the photographing operation by using another action, such as a voice action. This is not specifically limited in this specification. Using an example in which the specific action is that the first object says a preset voice instruction (for example, take a picture), after determining a to-be-photographed live streaming room picture (i.e. a live streaming picture) by changing a gesture frame range and size, the first object says "take a picture", and the first client may photograph an interactive picture based on a picture size and a picture region in response to a photographing operation triggered by the first object based on the specific action, and present the interactive picture in a live streaming interface.

In the foregoing implementation, when viewing a live stream in the live streaming room, the first object may trigger a photographing function by using a gesture at any time, and record an instant in the live streaming room, to ensure that the object has a demand for photographing and inviting a live streamer to sign, and implement live streaming signature interaction based on this.

In addition, in the present disclosure, not only the photographing function can be triggered based on the VR handheld controller, but also the photographing function can be quickly triggered by means of VR gesture framing without the VR handheld controller, so that photographing better conforms to operations in a virtual world. Photographing is implemented by recognizing a specific gesture of the first object in the VR live streaming scene, so that the first object may photograph in the VR live streaming room in a more visual and convenient operation manner. In this more visual and immersive photographing manner, the photographing efficiency of the VR live streaming is improved.

(2) In a non-VR live streaming scene, the live streaming picture is a common 2-dimension (2D) live streaming picture, and the picture obtaining operation may be a screenshot operation. The first object may capture, by using a picture obtaining operation, a live streaming picture currently played in a live streaming interface, to obtain an interactive picture for signature interaction.

Specifically, the first object may capture a full screen, or may capture a live streaming picture in a specific region of a current live streaming interface, to obtain an interactive picture. This is not specifically limited in this embodiment of the present disclosure.

For example, first objects of a mobile phone end and a PC end may save a live streaming site picture by means of screenshot, and transmit the picture to a second client to which a second object (for example, a live streamer) logs in, to invite the second object to sign.

In the foregoing implementation, the first object may take a screenshot of the live streaming picture in a non-VR live streaming room more conveniently, to determine an interactive picture in a more visual and convenient operation manner, thereby improving the interaction efficiency of the VR live streaming.

In summary, the live streaming interaction method in this embodiment of the present disclosure is applicable to all live streaming scenes, is not limited to a VR live streaming room, and is also applicable to a live streaming application such as a mobile phone end or a PC end (for example, live streaming shopping of shopping software, or live streaming sales of short video software). This is not specifically limited in this specification.

The following describes the live streaming interaction method in this embodiment of the present disclosure in detail in, for example, a VR live streaming scene.

S22: The first client transmits the interactive picture to a second client via a signature invitation request in response to a signature invitation operation triggered by the first object based on the interactive picture, so that a second object logged into the second client performs signature interaction with the first object based on the interactive picture.

S23: The first client receives and presents a signature result for the interactive picture.

The signature result is generated by the second object performing signature interaction based on the interactive picture.

Specifically, the interactive picture is generated based on a live streaming picture in a live streaming interface after the first object triggers a picture obtaining operation on the live streaming interface. Therefore, the signature result may alternatively be understood as being generated by the second object performing signature interaction with the first object based on the interactive picture.

Specifically, the signature result may include signature information (which may be recorded as first signature information) related to the first object, such as name information of the first object or a persuasive language (any persuasive language) about requesting from the first object for signing by the second object. Alternatively, the signature result may include only signature information related to the second object (which may be recorded as second signature information), such as name information of the second object or a signature persuasive language written by the second object. The signature persuasive language written by the second object may be a blessing, or may be a common persuasive language (such as spoken words) of the second object, a sentence/a paragraph extracted by the second object, or the like. Specifically, the signature persuasive language may be any persuasive language. This is not specifically limited in this specification.

Alternatively, the signature result may include signature information related to the first object and the second object, for example, include both a name of the first object and a name of the second object, and blessings written by the second object. This is not specifically limited in this embodiment of the present disclosure.

The name information of the first object or the name information of the second object may be a real name, a nickname, or the like. This is not specifically limited in this embodiment of the present disclosure.

In this embodiment of the present disclosure, in a process of viewing a live stream, a first object may obtain, by using a picture obtaining operation, an interactive picture generated based on current live streaming, and transmit the interactive picture to a second client by using a first client. After the second client receives the interactive picture, a second object logged into the second client performs a signature interaction operation based on the interactive picture, to obtain a corresponding signature result, feeds back the signature result to the first client by using the second client, and presents the signature result to the first object by using the first client.

In the foregoing implementation, a closed-loop procedure of signature interaction is implemented, and a new live streaming room interaction form is provided, thereby enriching information interaction manners in a VR live streaming room, satisfying a personalized live streaming interaction requirement between objects, and improving interaction interestingness.

Specifically, in this embodiment of the present disclosure, after obtaining, by using a picture obtaining operation, an interactive picture generated based on current live streaming, the first object may store the interactive picture locally and/or to a server, may edit the interactive picture, or may transmit the interactive picture to a second object for signature interaction.

The second object may be an association object of a live stream currently viewed by the first object, and is not limited to being a live streamer or another viewer.

The first object may further store the interactive picture locally and/or to the server after editing the interactive picture. In addition, before transmitting the interactive picture to the second object, the first object may edit the interactive picture.

Figure 6:
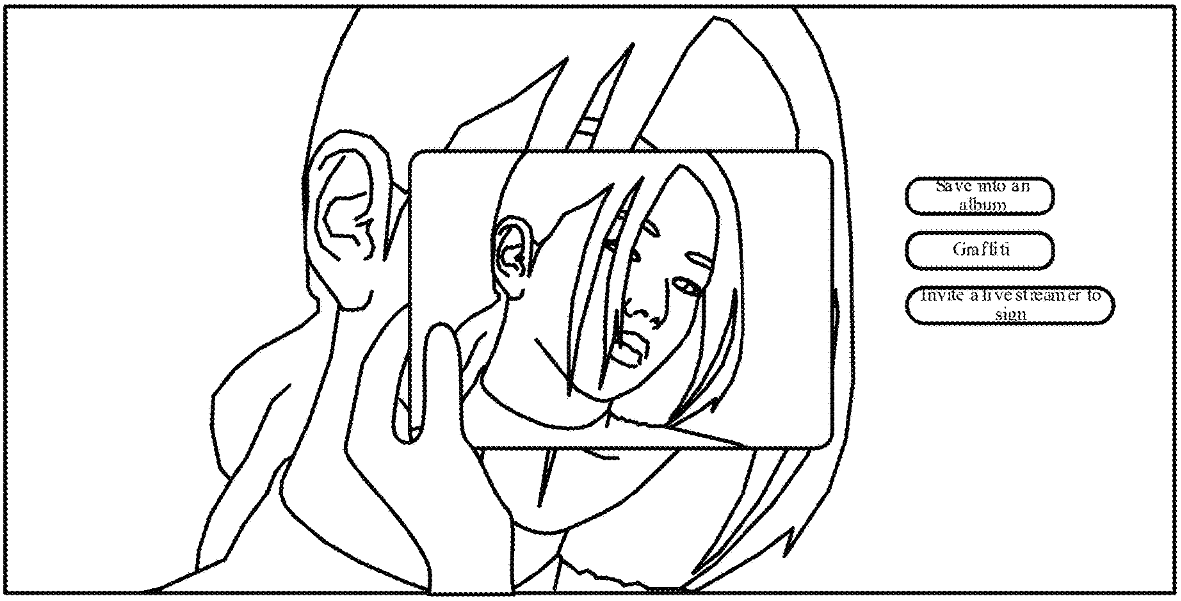
FIG. 6 is a schematic diagram of an interactive picture presented in a live streaming interface according to an embodiment of the present disclosure.

FIG. 6 shows a schematic diagram of an interactive picture presented in a live streaming interface according to an embodiment of the present disclosure. Part S61 is an interactive picture obtained by the first object, and part S62 is an entry of a function operation that may be performed on the interactive picture. For example, after obtaining an interactive picture by using a picture obtaining operation such as photographing or screenshot, an object may perform an operation on the interactive picture, which has three functions: Save into an album, Graffiti, and Invite a live streamer to sign.

The object clicks/taps "Save into an album", and photos are directly saved into the album. The object clicks/taps "Graffiti", a graffiti manner is entered, and the object may perform writing and drawing on a picture (i.e. the interactive picture) by using a gesture. The object clicks/taps "Invite a live streamer to sign", a secondary confirmation pop-up window is entered, and the object may write what is expected to be written by the live streamer and transmit an invitation.

An example in which the second object is a live streamer is used in FIG. 6. Certainly, the second object may alternatively be another viewer viewing the current live stream.

Then, the function "Invite a live streamer to sign" may be adaptively adjusted to "Invite XXX to sign". After the first object clicks/taps the function icon, another viewer viewing the current live stream may be presented, and the first object further selects another viewer to be interacted as the second object. This is not specifically limited in this specification.

In an exemplary embodiment, before operation S22 is implemented, the method further includes: editing the interactive picture correspondingly in response to an editing operation performed by the first object for the interactive picture, and presenting an edited interactive picture. To be specific, after obtaining the interactive picture by performing the picture obtaining operation using the first object, the first client does not directly transmit the interactive picture to the second client, but edits the interactive picture in advance based on a requirement of the first client.

Based on this, operation S22 is: transmitting the edited interactive picture to the second client by using the signature invitation request in response to a signature invitation operation triggered by the first object for the edited interactive picture.

Figure 7:
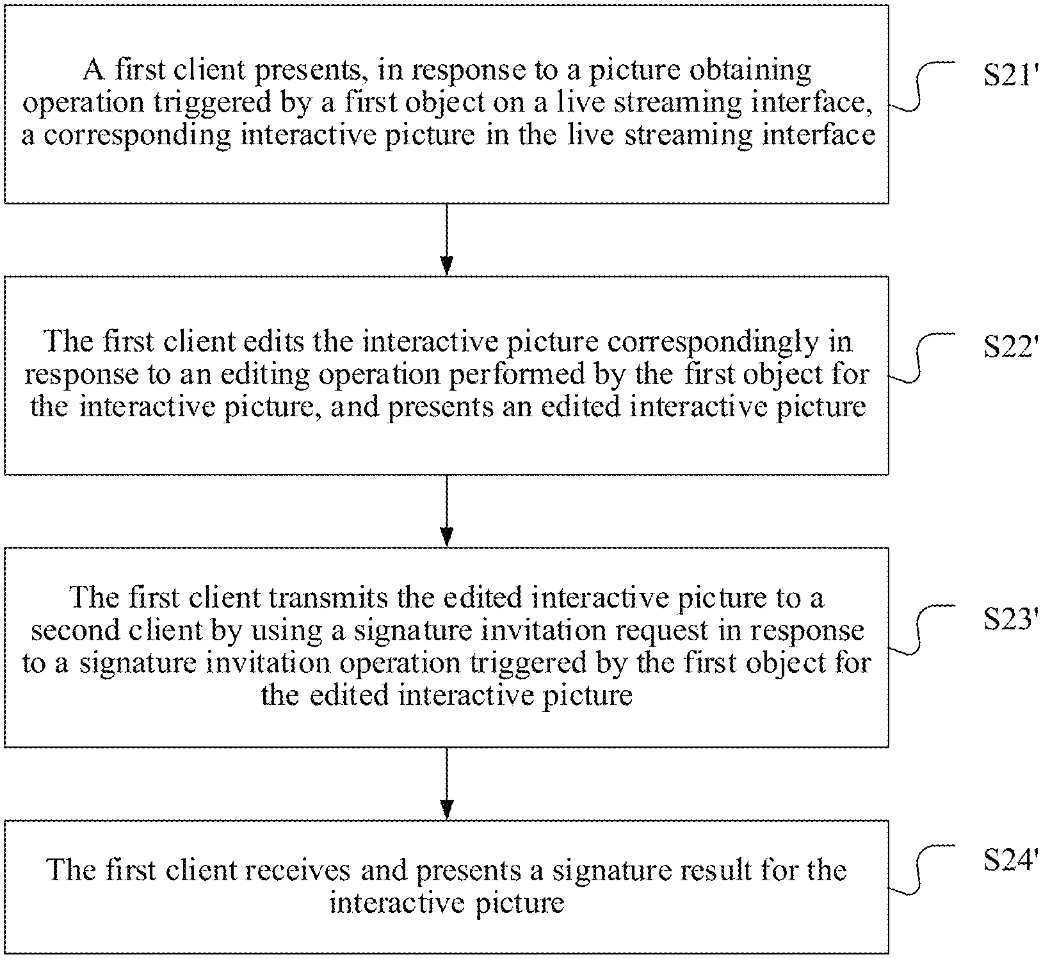
FIG. 7 is an implementation flowchart of a second live streaming interaction method according to an embodiment of the present disclosure.

FIG. 7 shows an implementation flowchart of a second live streaming interaction method according to an embodiment of the present disclosure. Taking a first client as an execution subject as an example, a specific implementation procedure of the method includes the following S21 to S24.

S21': A first client presents, in response to a picture obtaining operation triggered by a first object on a live streaming interface, a corresponding interactive picture in the live streaming interface.

S22': The first client edits the interactive picture correspondingly in response to an editing operation performed by the first object for the interactive picture, and presents an edited interactive picture.

S23': The first client transmits the edited interactive picture to a second client via a signature invitation request in response to a signature invitation operation triggered by the first object for the edited interactive picture.

S24': The first client receives and presents a signature result for the interactive picture.

The flowchart shown in FIG. 7 represents a process in which after obtaining an interactive picture, an object first edits the interactive picture and then transmits the interactive picture to a second client, so that a second object performs signature interaction.

In this embodiment of the present disclosure, the editing operation performed on the interactive picture by the first object may be any editing operation performed on a picture, and includes, but is not limited to: cutting, filtering, splicing, graffiti, adding stickers, and the like.

An example in which the editing operation is a graffiti operation is used below. An exemplary implementation is that S22' may be performed according to the procedure shown below, including the following operations S22'1 to S22'2:

S22'1: The first client obtains a gesture track of the first object on the interactive picture in response to a graffiti operation, triggered by the first object using a graffiti control, for the interactive picture.

S22'2: The first client recognizes and presents graffiti content painted by the first object on the interactive picture using the gesture track, to obtain the edited interactive picture.

Figure 8:
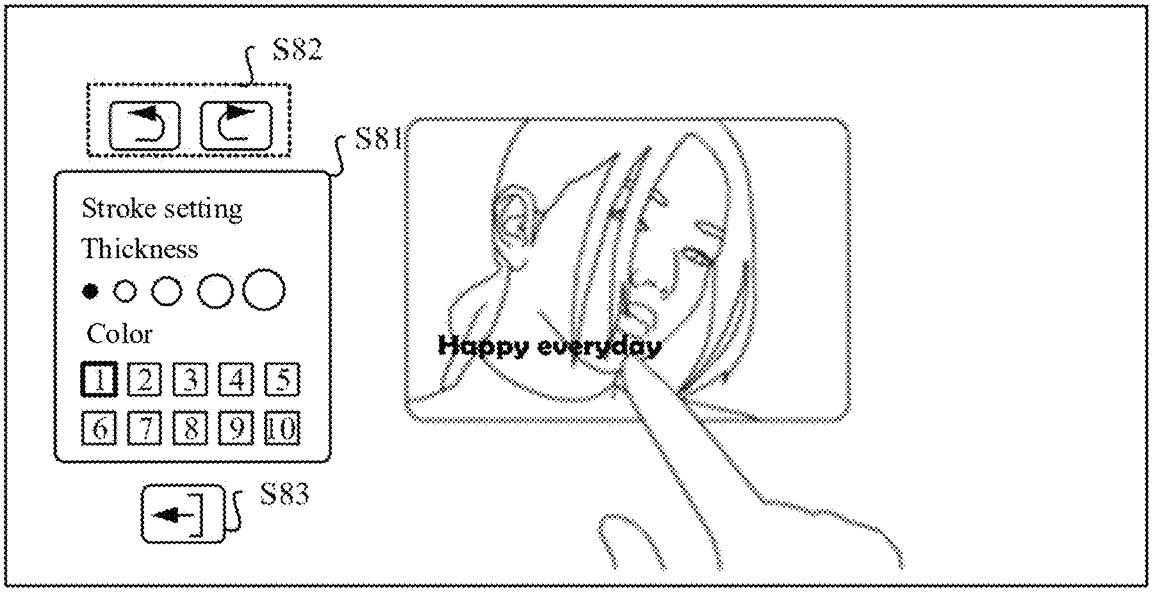
FIG. 8 is a schematic diagram of a graffiti interface according to an embodiment of the present disclosure.

Still using the live streaming interface shown in FIG. 6 as an example, the first object clicks/taps the graffiti control "Graffiti", to present a graffiti interface shown in FIG. 8. FIG. 8 is a schematic diagram of a graffiti interface according to an embodiment of the present disclosure. On the graffiti interface, the first object may perform stroke setting, for example, setting of a thickness and a color as shown in S81 in FIG. 8, and the thickness and color that are currently selected by the first object are highlighted in the stroke setting part (if the first object does not perform selection, a default thickness and color may be highlighted). As shown in FIG. 8, what is currently selected by the first object is a first thickness, and the currently selected color is gray (i.e. color 1 in FIG. 8). Then, the first object may perform writing and drawing on the interactive picture by using a finger, a stylus, or the like in the graffiti mode.

In the graffiti process, the first object may further click/tap a button such as cancel shown in S82, to modify the graffiti content. After the graffiti is completed, a save button shown in S83 may further be clicked/tapped to save the graffiti interactive picture.

In the foregoing implementation, an object may photograph a live streaming room at any time while immersively viewing performance of a live streamer, may create a photo again, edit content in the photo, and transmit the photo to the live streamer, or may invite the live streamer to sign, and edit the photo together with the live streamer.

In addition, in this embodiment of the present disclosure, the first client may directly transmit the interactive picture to the second client, or may transmit the interactive picture and signature information to be signed by the second object on the interactive picture based on a request together to the second client.

An exemplary implementation is that, after responding to the signature invitation operation triggered based on the interactive picture, the first client may further obtain signature information inputted by the first object in response to an input operation triggered by the first object. Further, the interactive picture and the signature information are transmitted to the second client by using the signature invitation request, so that the second object performs signature interaction with the first object based on the interactive picture and the signature information.

To be specific, after triggering the signature invitation request, the first object may further trigger the input operation, to input signature information to be signed by the second object, so that the second object directly performs signature interaction according to the signature information.

In some embodiments, when the signature information in this embodiment of the present disclosure is information to be signed by the second object on the interactive picture based on the request of the first object (i.e. first signature information), the signature information includes but is not limited to at least one of the following:

name information of the first object; and a persuasive language about requesting from the first object for signing by the second object.

The name information of the first object may be a real name, a nickname, or the like. This is not specifically limited in this embodiment of the present disclosure, provided that the name information can represent an identity of the first object. The persuasive language about requesting from the first object for signing by the second object is specifically determined according to an actual requirement of the first object, and may be any persuasive language (such as blessings). This is not specifically limited in this specification.

There are a plurality of manners in which an object inputs signature information. An exemplary implementation is as follows.

The first client presents a confirmation interface in response to a signature invitation operation triggered by the first object using a signature control. Further, the first client obtains the signature information inputted by the first object in response to an input operation triggered by the first object based on the confirmation interface. Finally, the first client transmits the interactive picture and the signature information to the second client in response to a confirmation operation triggered by the first object based on the confirmation interface.

In this embodiment of the present disclosure, after the first object triggers the signature invitation operation, the first client may directly transmit the signature invitation request to the second client, or may not directly transmit the signature invitation request. Instead, the first object performs secondary confirmation. After the first object performs secondary confirmation, the first client then transmits the signature invitation request to the second client.

Specifically, the first object may perform an operation of confirming the signature invitation after inputting the signature information in a confirmation interface. The confirmation interface may be in various forms such as a pop-up window, a floating layer, and a floating window, or may be an independent page. This is not specifically limited in this specification.

Figure 9:
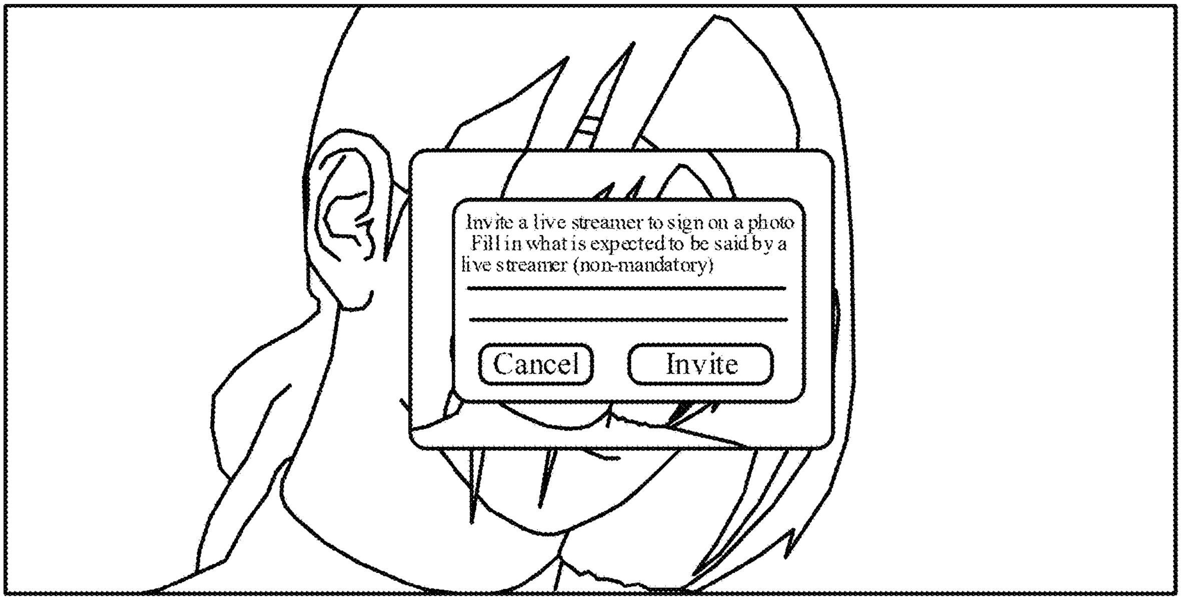
FIG. 9 is a schematic diagram of a confirmation interface according to an embodiment of the present disclosure.

For example, after an object clicks/taps "Invite a live streamer to sign" shown in FIG. 6, a confirmation interface shown in FIG. 9 may be presented.

FIG. 9 shows a schematic diagram of a confirmation interface according to an embodiment of the present disclosure. A pop-up window is used as an example in FIG. 9. In the pop-up window shown in FIG. 9, two buttons: "Cancel" and "Invite" are displayed. If an object clicks/taps "Cancel", a current signature invitation operation may be canceled. If the object clicks/taps "Invite", a confirmation operation, namely secondary confirmation, may be triggered.

For example, the object may input "signature information" by using a virtual keyboard. As shown in FIG. 9, "signature information" is filled in at a position of "Filling in what is expected to be said by a live streamer (non-mandatory)", and then "Invite" is clicked/tapped, to transmit the signature information and the interactive picture together to the second object by using the first client.

As shown in FIG. 9, the item is a non-mandatory item. To be specific, after opening the pop-up window shown in FIG. 9, the first object may directly click "Invite" to transmit the interactive picture to the second client by using the first client.

In the foregoing implementation, the first object may directly transmit, to the second object for reference, information to be signed by the other party based on a request, thereby improving speed at which the second object performs signature interaction, and further improving efficiency of the signature interaction.

In some embodiments, after the interactive picture is transmitted to the second client by using the signature invitation request, transmitting prompt information may further be presented in the live streaming interface, and the first object is informed by using the transmitting prompt information that the current signature invitation has been successfully transmitted to the second client.

The transmitting prompt information may be presented by using a sub-interface such as a floating layer or a pop-up window, or may be directly presented in a current interface. This is not specifically limited in this embodiment of the present disclosure.

In some embodiments, the transmitting prompt information may no longer be displayed after being presented for a particular duration (for example, 10 s), or may be closed by the first object. This is not specifically limited in this embodiment of the present disclosure.

Figure 10:
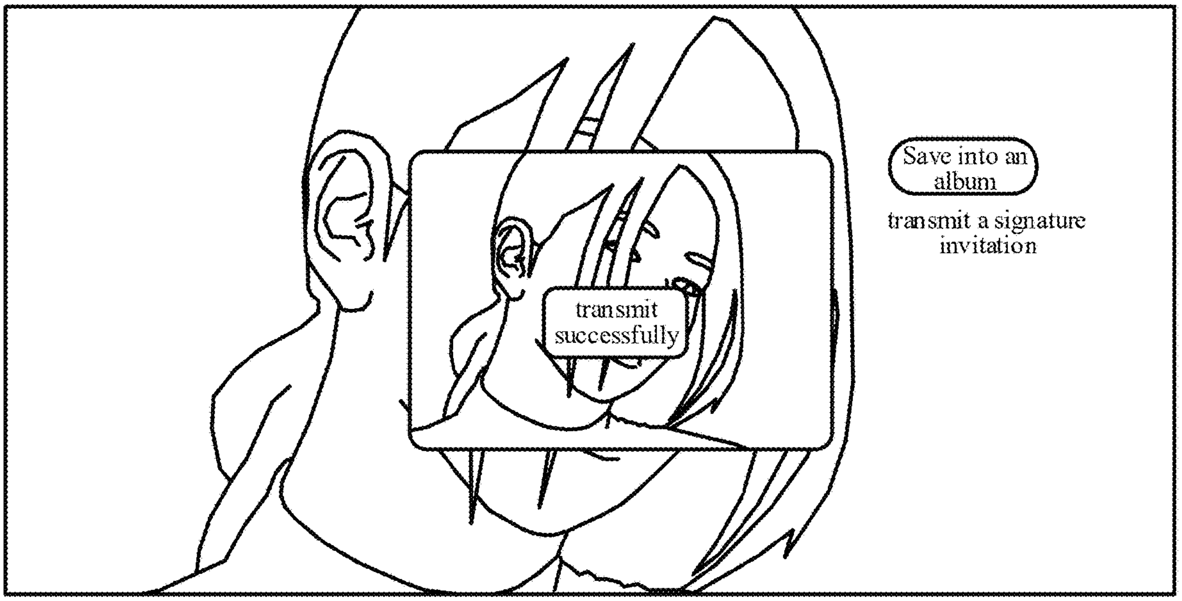
FIG. 10 is a schematic diagram of transmitting prompt information according to an embodiment of the present disclosure.

FIG. 10 shows a schematic diagram of transmitting prompt information according to an embodiment of the present disclosure. "Transmit successfully" shown in S100 in FIG. 10 is an example of transmitting prompt information according to this embodiment of the present disclosure.

In the foregoing implementation, by presenting the transmitting prompt information, a result of the current signature invitation may be clearly described to the first object, to avoid repeated transmission, thereby improving live streaming stress on the server to some extent.

In this embodiment of the present disclosure, after the interactive picture (and the signature information) of the first object is transmitted to the second client, the second object may sign the interactive picture, and feed back a signature result to the first object. The first client presents the signature result to the first object.

Figure 11:
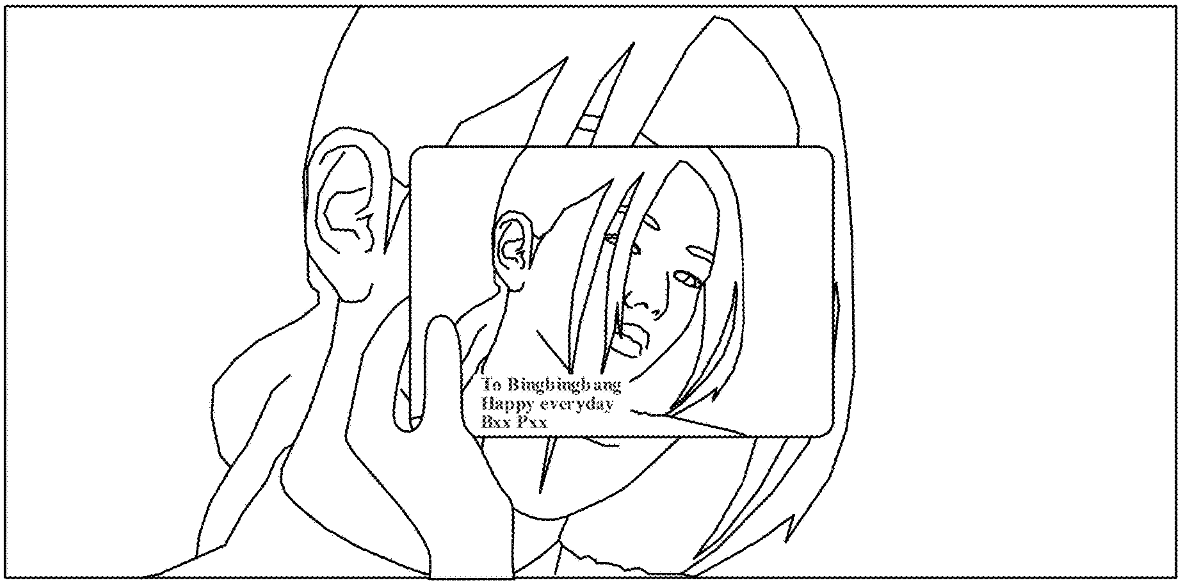
FIG. 11 is a schematic diagram of transmitting prompt information according to an embodiment of the present disclosure.

FIG. 11 shows a schematic diagram of a signature result according to an embodiment of the present disclosure. A gray text in FIG. 11 is content signed by the second object.

In the foregoing implementation, the procedure of photographing by the first object and signing by the second object is closed, so that interaction stickiness between the second object and the first object in the live streaming room is increased, thereby improving activeness of the live streaming room. In addition, when the second object is a live streamer, the closed procedure also provides the second object with a means for operating private domain traffic. The second object uses a signature for the first object to strengthen a direct relationship with the first object, thereby improving retention of the first object.

The foregoing implementation describes the live streaming interaction method in this embodiment of the present disclosure mainly from the side of the first client to which the first object logs in.

The following further describes the live streaming interaction method in this embodiment of the present disclosure by using an example from the side of the second client to which the second object logs in.

Figure 12:
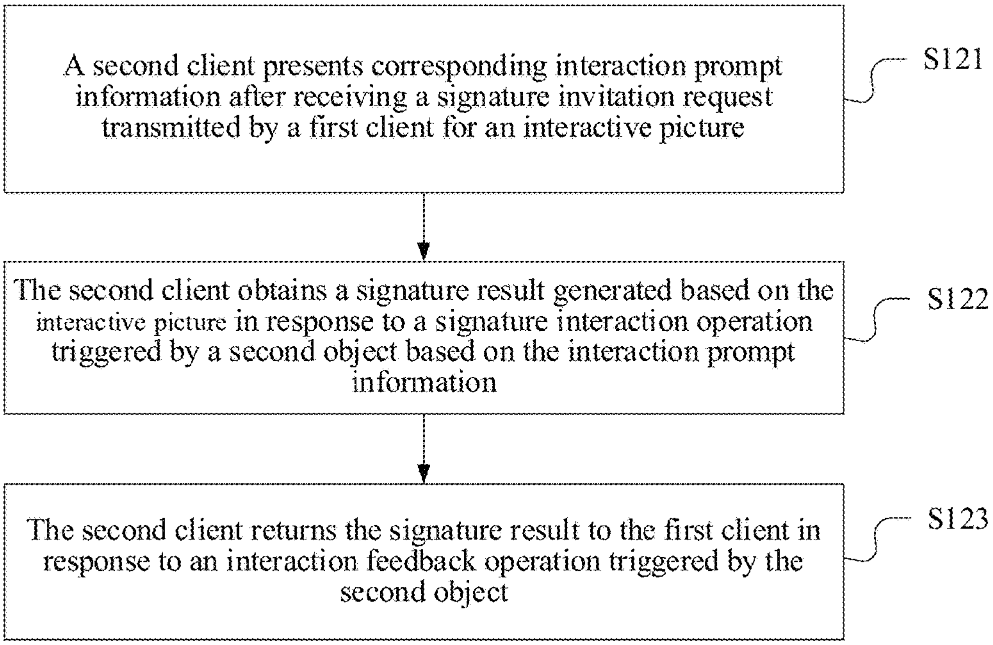
FIG. 12 is an implementation flowchart of a third live streaming interaction method according to an embodiment of the present disclosure.

FIG. 12 shows an implementation flowchart of a third live streaming interaction method according to an embodiment of the present disclosure. Taking a second client as an execution subject as an example, a specific implementation procedure of the method includes:

S121: A second client presents corresponding interaction prompt information after receiving a signature invitation request transmitted by a first client for an interactive picture.

The interaction prompt information indicates that a first object initiates a signature interaction to a second object. The interactive picture is generated based on a live streaming picture in a live streaming interface after the first object triggers a picture obtaining operation on the live streaming interface.

In this embodiment of the present disclosure, after the first object transmits the signature invitation request to the second object, the second client to which the second object logs in first prompts the second object by using the corresponding interaction prompt information. The second object is informed that a signature invitation request of a first object is received. When the first object further transmits the signature information, only the second object may be informed that a signature invitation request of a first object is received. Alternatively, based on this, the signature information published by the first object may be further presented by using interaction prompt information.

An exemplary implementation includes: presenting the interaction prompt information in a message region associated with the second object, where the interaction prompt information includes the signature information transmitted by the first object.

The message region associated with the second object is a region for presenting, to the second object, a message transmitted by another object to the second object. The message region may include one or more types of messages, including at least a message of a signature invitation type.

Figure 13:
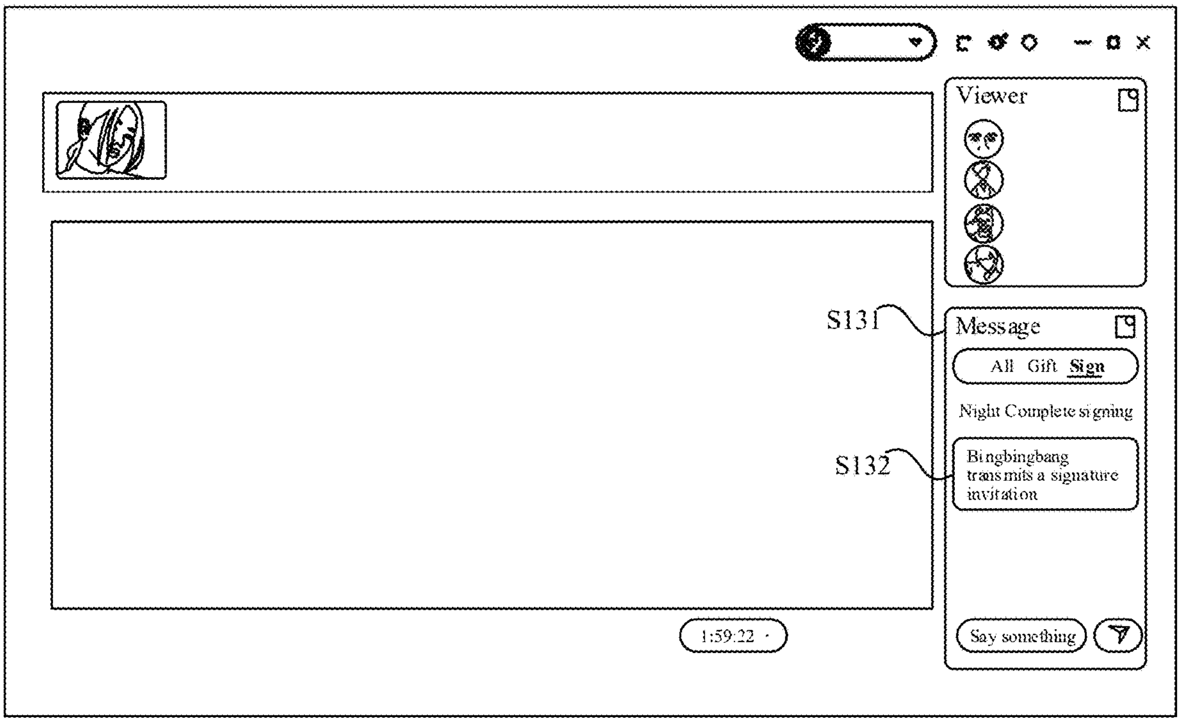
FIG. 13 is a schematic diagram of interaction prompt information according to an embodiment of the present disclosure.

FIG. 13 shows a schematic diagram of interaction prompt information according to an embodiment of the present disclosure. In a message region S131 of an interface shown in FIG. 13, a type of interaction prompt information is presented, for example, S132 "Bingbingbang transmits a signature invitation".

The interaction prompt information may be used as a type of signature prompt message, and may be presented in a sign partition in the message region, or may be presented in an All partition in the message region.

In this embodiment of the present disclosure, the All partition may be configured for presenting various types of messages received by the second object in the current live stream. The Sign partition is only configured for presenting a prompt message related to signature interaction, such as interaction prompt information and interaction feedback information in this specification.

Figure 14:
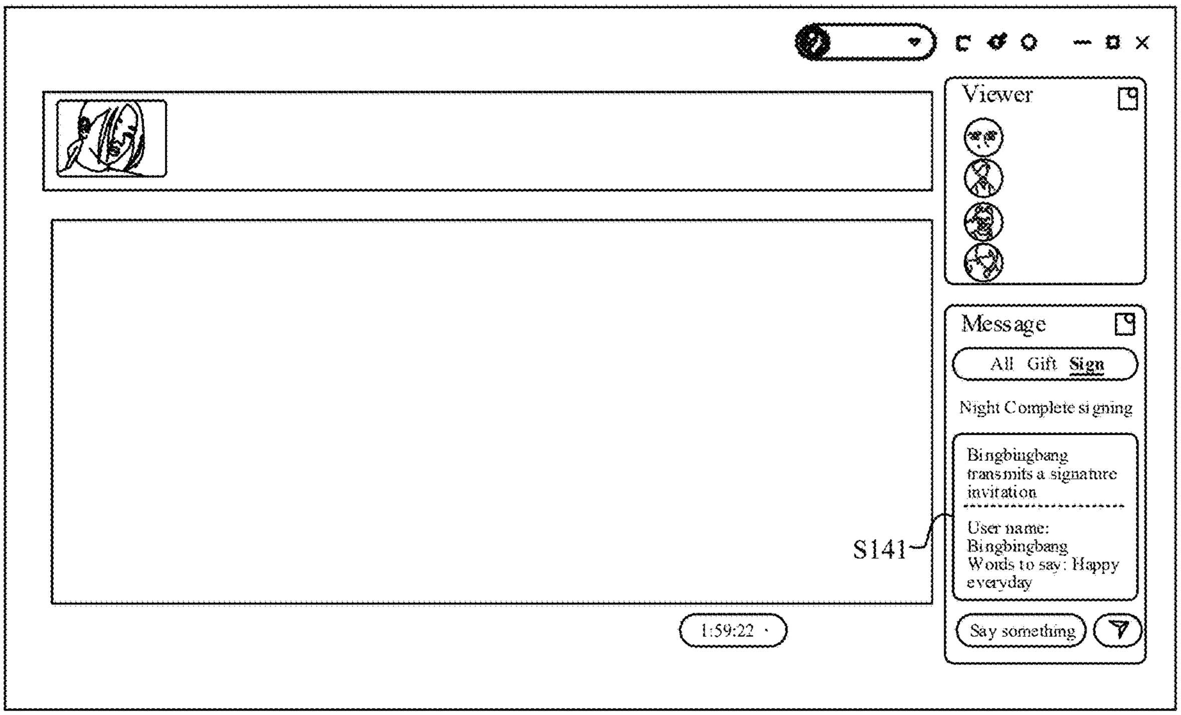
FIG. 14 is a schematic diagram of another interaction prompt information according to an embodiment of the present disclosure.

FIG. 14 shows a schematic diagram of another type of interaction prompt information according to an embodiment of the present disclosure. As shown in interaction prompt information S141 in FIG. 14, in addition to displaying "Bingbingbang transmits a signature invitation", corresponding signature information is further presented. For example, if the name of the first object is "Bingbingbang", a persuasive language about requesting from the first object for signing by the second object is "happy everyday".

In this embodiment of the present disclosure, the interaction prompt information is presented in the message region, so that the second object can view the signature invitation of the first object in time. In addition, the signature information transmitted by the first object may be directly presented in the message region, so that the second object learns of a signature demand of the first object in time.

S122: The second client obtains a signature result generated based on the interactive picture in response to a signature interaction operation triggered by a second object based on the interaction prompt information.

S123: The second client returns the signature result to the first client in response to an interaction feedback operation triggered by the second object.

In this embodiment of the present disclosure, that the second object performs a signature interaction operation specifically means that the second object signs signature information on the interactive picture. There are a plurality of specific signing manners, such as signing by an air gesture, and signing by using a touchpad. This is not specifically limited in this embodiment of the present disclosure.

An exemplary implementation includes that S122 may be performed according to the procedure shown below, including the following operations S1221 to S1222:

S1221: The second client presents a signature interface in response to the signature interaction operation triggered by the second object based on the interaction prompt information.

The signature interface may be an independent interface, or may be a sub-interface, such as a floating layer or a pop-up window, further presented based on the live streaming interface. This is not specifically limited in this specification.

S1222: The second client recognizes and presents content signed by the second object on the interactive picture using the signature interface, and obtains the signature result generated based on the interactive picture.

In this embodiment of the present disclosure, when the first object transmits signature information to the second object, the signature information indicates information to be signed by the second object based on a request of the first object, and may be used as a reference of content signed by the second object on the interactive picture in S1222. When the first object does not transmit signature information to the second object, in S1222, the content signed by the second object on the interactive picture indicates what is expected to be said to the first object by the second object.

Based on the foregoing, an exemplary implementation of S123 is as follows.

The second client returns the signature result to the first client in response to the interaction feedback operation triggered by the second object using a transmitting control in the signature interface.

Specifically, the second object may enter the signature interface in a manner such as clicking or holding the interaction prompt information. In this embodiment of the present disclosure, an object is supported to sign in many manners. Signature interfaces in different manners may also be different. This is not specifically limited in this specification.

The following respectively describes, by using examples, a signature information signing process in different writing manners:

Manner 1: First writing mode (signing by an air gesture).

When the first writing mode is used for signing, an exemplary implementation of S122 is as follows.

S1221-1: The second client starts a camera, and presents a signature interface in response to the signature interaction operation triggered by the second object based on the interaction prompt information.

S1222-1: The second client recognizes and presents, by using the camera, content signed by the second object on the gesture writing layer using a preset writing gesture.

The signature interface includes a gesture writing layer, so as to sign content on the gesture writing layer. In one embodiment, the signature interface may further include an interactive picture layer and a camera-shot picture layer.

Figure 15:
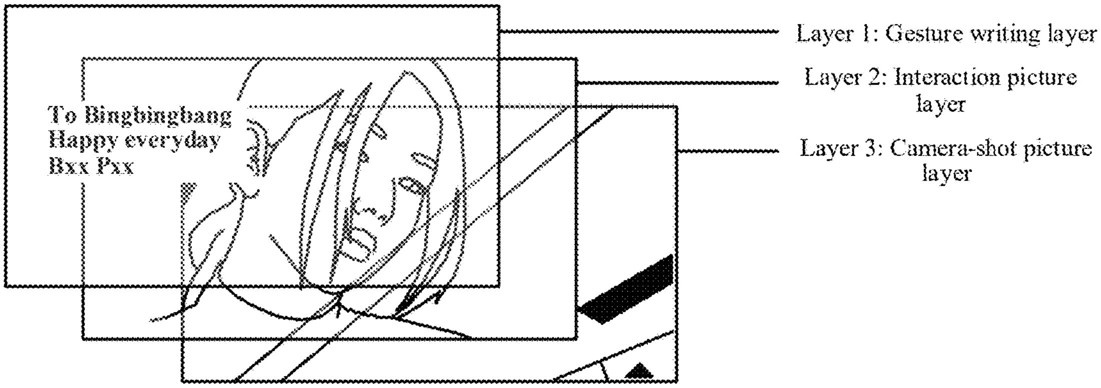
FIG. 15 is a schematic diagram of layer distribution of a signature interface according to an embodiment of the present disclosure.

In this embodiment of the present disclosure, the second object (for example, a live streamer) may write by an air gesture through a camera of a PC end. Specifically, after the second object clicks/taps a signature invitation (i.e. interaction prompt information), the camera may be started, and a signature interface is displayed on a screen. The signature interface in the first writing mode may be in a form of a signature panel. The signature panel mainly includes three layers of content. FIG. 15 shows a schematic diagram of layer distribution of a signature interface according to an embodiment of the present disclosure. The signature panel mainly includes three layers of content. From top to bottom, the three layers of content are sequentially:

Layer 1: a gesture writing layer; Layer 2: an interactive picture layer (i.e. a photo layer transmitted from the first object); Layer 3: a camera-shot picture layer.

In some embodiments, the preset writing gesture includes, but is not limited to: a gesture for writing content, and a gesture for erasing content.

For example, a specific gesture is described: When an object makes a writing gesture with the index finger stretched, a track in which the index finger swipes across a screen is recorded by using a camera, for writing content. When the object makes an eraser gesture with the palm spread, an eraser function is enabled, and content to be written may be erased or modified.

The foregoing listed preset writing gestures of writing content with the index finger stretched and erasing content with the palm spread are merely simple examples. Actually, any preset writing gesture is applicable to this embodiment of the present disclosure. This is not specifically limited in this specification.

Figure 16A:
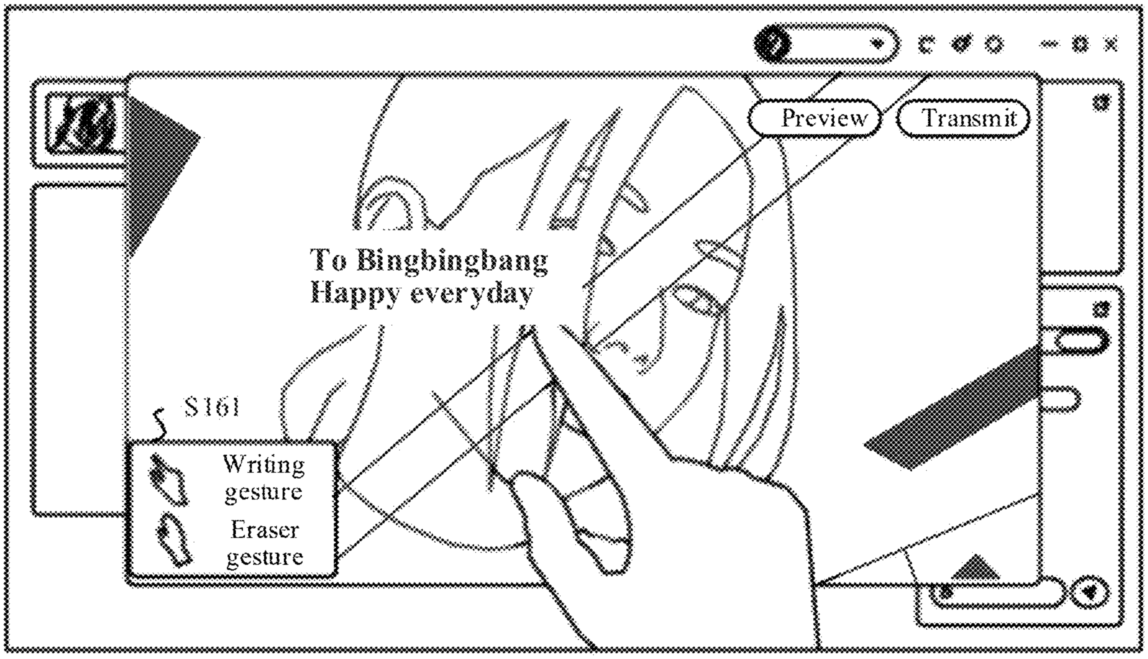
FIG. 16A is a schematic diagram of an air signature according to an embodiment of the present disclosure.

FIG. 16A shows a schematic diagram of an air signature according to an embodiment of the present disclosure. On a client on a second object side, at a lower left corner S161 of a signature interface, specific gesture patterns of a writing gesture and an eraser gesture are prompted. The second object may sign, according to the prompt, content to be said to the first object by using a corresponding air gesture.

Figure 16B:
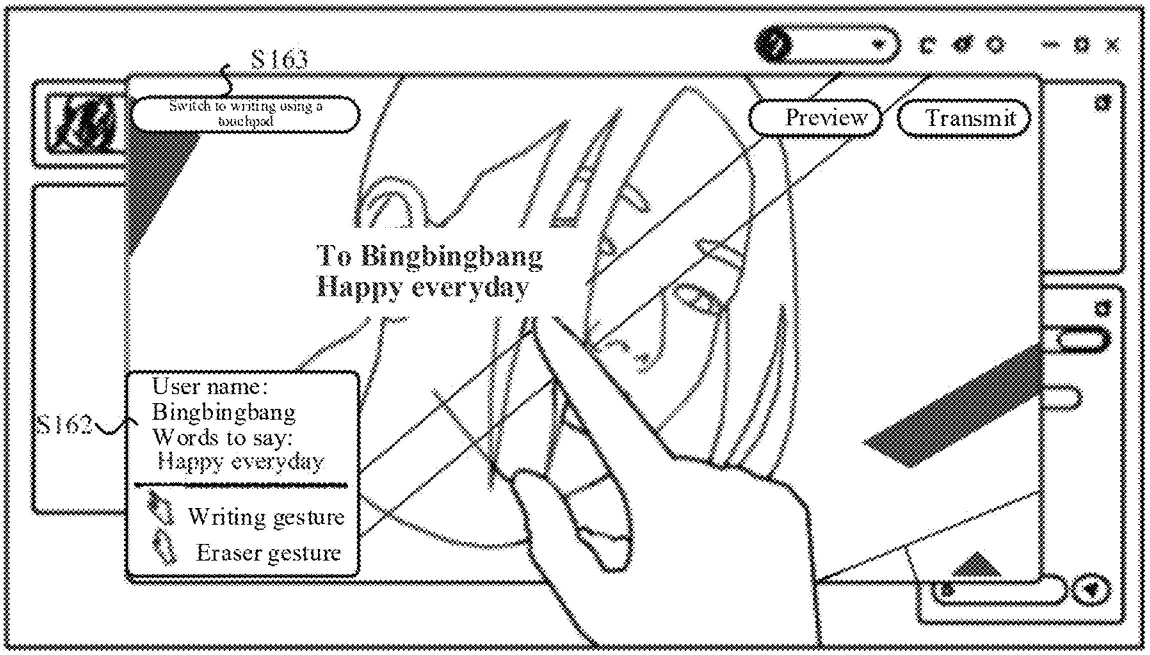
FIG. 16B is a schematic diagram of another air signature according to an embodiment of the present disclosure.

FIG. 16B shows a schematic diagram of another air signature according to an embodiment of the present disclosure. Compared with the signature interface shown in FIG. 16A, two pieces of information are added to a signature interface shown in FIG. 16B. One is signature information S162 transmitted by the first object to the second object at a lower left corner, and the other is a mode switching control S163 at an upper left corner.

Specifically, when the signature invitation request transmitted by the first object to the second object includes signature information, a signature information prompt may be presented in the signature interface, so that the second object signs according to the signature information prompt. As listed in part S162 in FIG. 16B, a user name (Bingbingbang) and words to say (Happy everyday) are included.

In addition, the object may switch the writing mode by using a mode switching control in a current interface. A mode switch control "Switch to write using a touchpad" shown in S163 is clicked/tapped, to switch from a first writing mode to a second writing mode.

The signature information prompt shown in S162 is presented only when the first object transmits corresponding signature information to the second object.

In some embodiments, in the live streaming interaction method in the present disclosure, an object is further supported to preview a signature result. An exemplary implementation is as follows. The second client presents a preview interface of the signature result in response to a preview operation triggered by the second object using a preview control in the signature interface.

Specifically, the preview control may be in a form of a button, an icon, or the like. This is not specifically limited in this embodiment of the present disclosure.

Figure 17:
FIG. 17 is a schematic diagram of a preview interface of a signature result according to an embodiment of the present disclosure.

FIG. 17 shows a schematic diagram of a preview interface of a signature result according to an embodiment of the present disclosure. When an object clicks/taps a "Preview" button shown in an upper right corner of the signature interface, a preview operation may be triggered, to present a preview interface shown in FIG. 17. The preview interface is configured for displaying a current signature result. As a part S170 in FIG. 17, the current signature result is signature information signed by the second object in this embodiment of the present disclosure. The second object may click/tap a "Return" button based on this, to return to a signature interface and continue to update the signature information, or may click/tap a "Transmit" button based on this, to trigger an interaction feedback operation, to feed back the signature result to the first object.

In addition, in addition to triggering the interaction feedback operation on the preview interface, the object may alternatively not preview the signature result, and directly trigger the interaction feedback operation by using the signature interface. For example, the object clicks/taps a "Transmit" button shown at an upper right corner of the signature interface shown in FIG. 16A or FIG. 16B, to feed back the signature result to the first object.

In addition to the foregoing listed manners of previewing by using the preview control, the object may further perform preview in another manner, for example, by using a voice instruction or a preset preview gesture. This is not specifically limited in this specification.

In the foregoing implementation, the second object may not use a touchpad during signature, and signature tracks are collected by the server/the second client in a more convenient and quick manner of air gesture signing. Then, the signature tracks are composited onto the interactive picture photographed by the first object, to obtain a signature result, thereby improving live streaming interaction efficiency.

Manner 2: Second writing mode (signing by using a touchpad).

When the second writing mode is used for signing, an exemplary implementation of S122 is as follows.

S1221-2: The second client presents a signature interface in response to the signature interaction operation triggered by the second object based on the interaction prompt information, where the signature interface displays the interactive picture.

S1222-2: The second client obtains a gesture track of the second object on the signature interface, and recognizes and presents, by using the gesture track, content signed by the second object on the interactive picture.

The touchpad in this embodiment of the present disclosure is a signature pad, and has a signature function. The second object may write, based on the signature function, a signature and words to say to the first object on the touchpad, and transmit back the signature and the words to the first object.

Figure 18A:
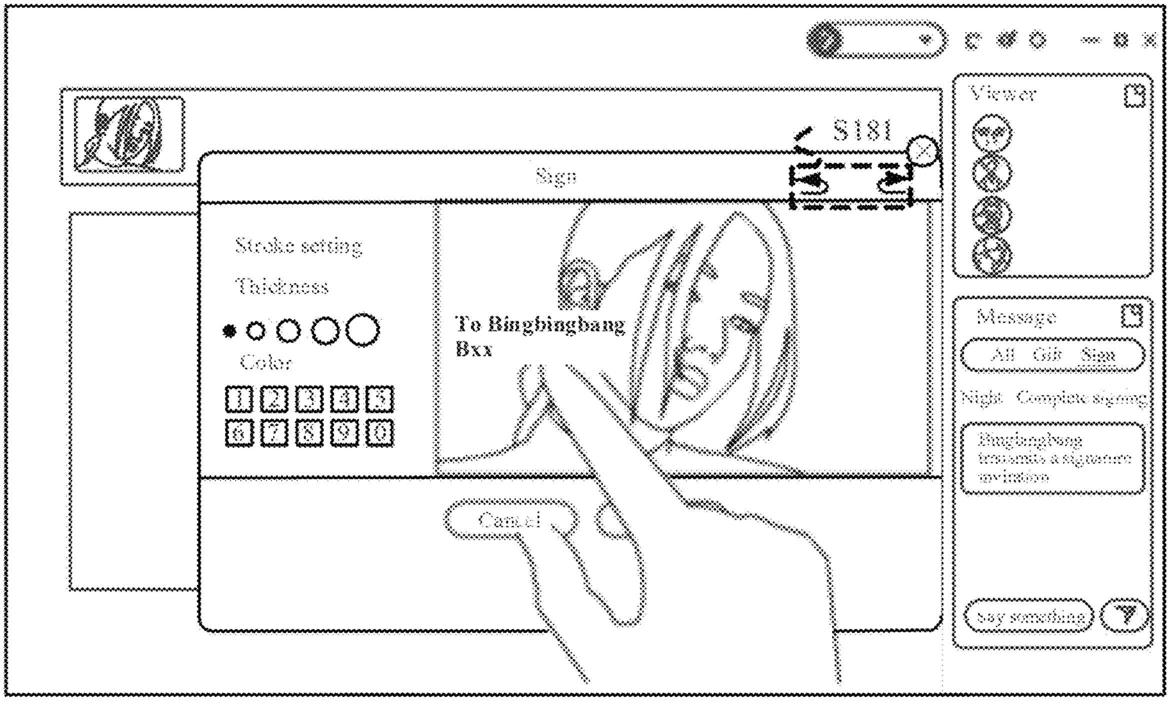
FIG. 18A is a schematic diagram of a touchpad signature according to an embodiment of the present disclosure.

FIG. 18A shows a schematic diagram of a touchpad signature according to an embodiment of the present disclosure. Similar to the graffiti interface listed in FIG. 8, on the signature interface shown in FIG. 18A, the second object may also perform stroke setting, for example, setting of a thickness and a color as shown in FIG. 18A, and the thickness and color that are currently selected by the second object are highlighted in the stroke setting part (if the second object does not perform selection, a default thickness and color may be highlighted). As shown in FIG. 18A, what is currently selected by the second object is a first thickness, and the currently selected color is gray (i.e. color 1 in FIG. 18A). Then, the second object may write to-be-written words and a signature by using a finger (or a stylus) at a position of a touchpad in a touch mode. There is a finger writing state on a terminal device side, which is convenient for a user to preview a signature state.

In the signing process, the second object may further click/tap a button such as cancel shown in S181 at an upper right corner, to modify the signature information. After the signing is completed, a "Transmit" button may further be clicked/tapped, to transmit the signature result to the first client.

Figure 18B:
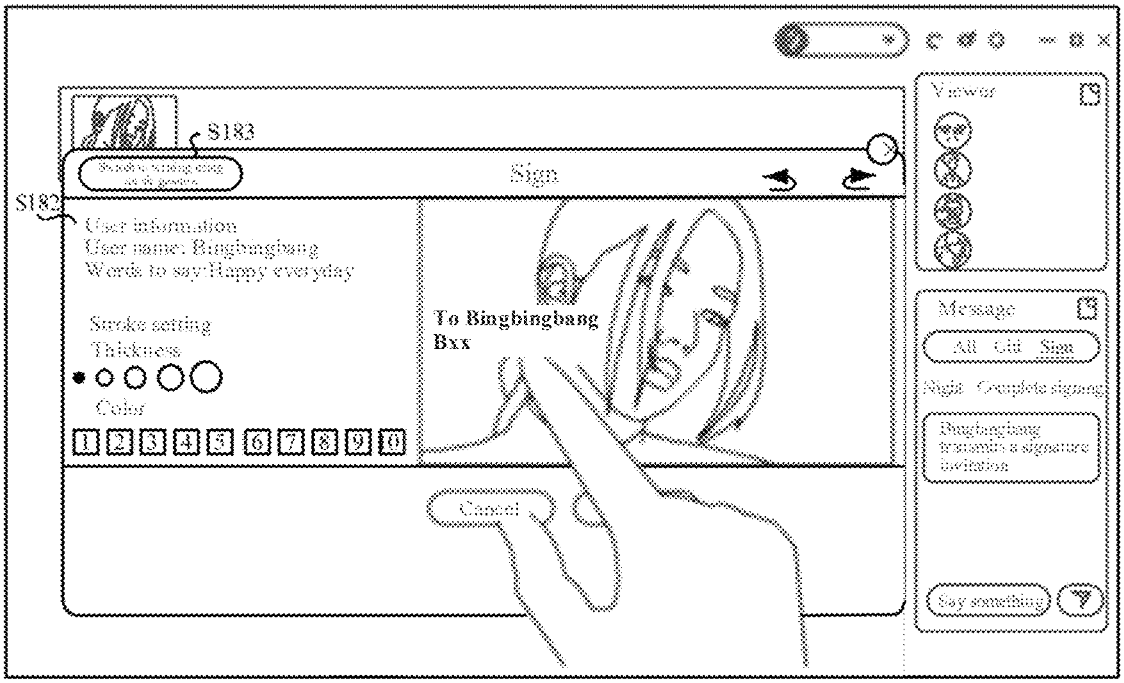
FIG. 18B is a schematic diagram of another touchpad signature according to an embodiment of the present disclosure.

FIG. 18B shows a schematic diagram of another touchpad signature according to an embodiment of the present disclosure. Compared with the signature interface shown in FIG. 18A, two pieces of information are added to a signature interface shown in FIG. 18B. One is signature information S182 transmitted by the first object to the second object at a lower left corner, and the other is a mode switching control S183 at an upper left corner.

Specifically, when the signature invitation request transmitted by the first client to the second client includes signature information, a signature information prompt may be presented in the signature interface, so that the second object signs according to the signature information prompt. As listed in part S182 in FIG. 18B, a user name (Bingbingbang) and words to say (Happy everyday) are included.

In addition, the second object may switch the writing mode by using a mode switching control in a current interface. A mode switch control "Switch to write by an air gesture" shown in S183 is clicked/tapped, to switch from a second writing mode to a first writing mode.

The signature information prompt shown in S182 is presented only when the first object transmits corresponding signature information to the second object.

In the foregoing implementation, the second object uses a more accurate touchpad signature manner during signature, thereby reducing the number of re-signatures, and improving live streaming interaction efficiency.

In some embodiments, the signature interface further includes: a mode switching control. In this case, the object may further implement random switching of the writing mode by using the mode switching control. Specifically, the client switches a writing mode for signing in response to a mode switching operation triggered for the mode switching control.

For a process of the mode switching operation triggered based on the mode switching control, refer to FIG. 16B or FIG. 18B. This is not limited herein again.

In addition, in S1221, after responding to the signature interaction operation triggered by the second object based on the interaction prompt information, the second client may directly present, by default, the signature interface shown in S1221-1 or S1221-2, or may prompt, before presenting the signature interface, the object of alternative writing modes, for example, including the first writing mode or the second writing mode, which is selected by the object. For example, when the object selects the first writing mode, the signature interface shown in S1221-1 is presented. When the object selects the second writing mode, the signature interface shown in S1221-2 is presented. This is not specifically limited in this embodiment of the present disclosure.

Based on this, if the object makes no selection, the corresponding signature interface may be presented according to the default writing mode.

In this embodiment of the present disclosure, the second object may select a more proper writing mode to perform signature according to a habit of the second object, thereby facilitating operations of the object.

In some embodiments, after returning the signature result to the first client, interaction feedback information may be presented in a message region associated with the second object, where the interaction feedback information indicates that the signature result of the interactive picture is successfully transmitted to the first client.

Figure 19:
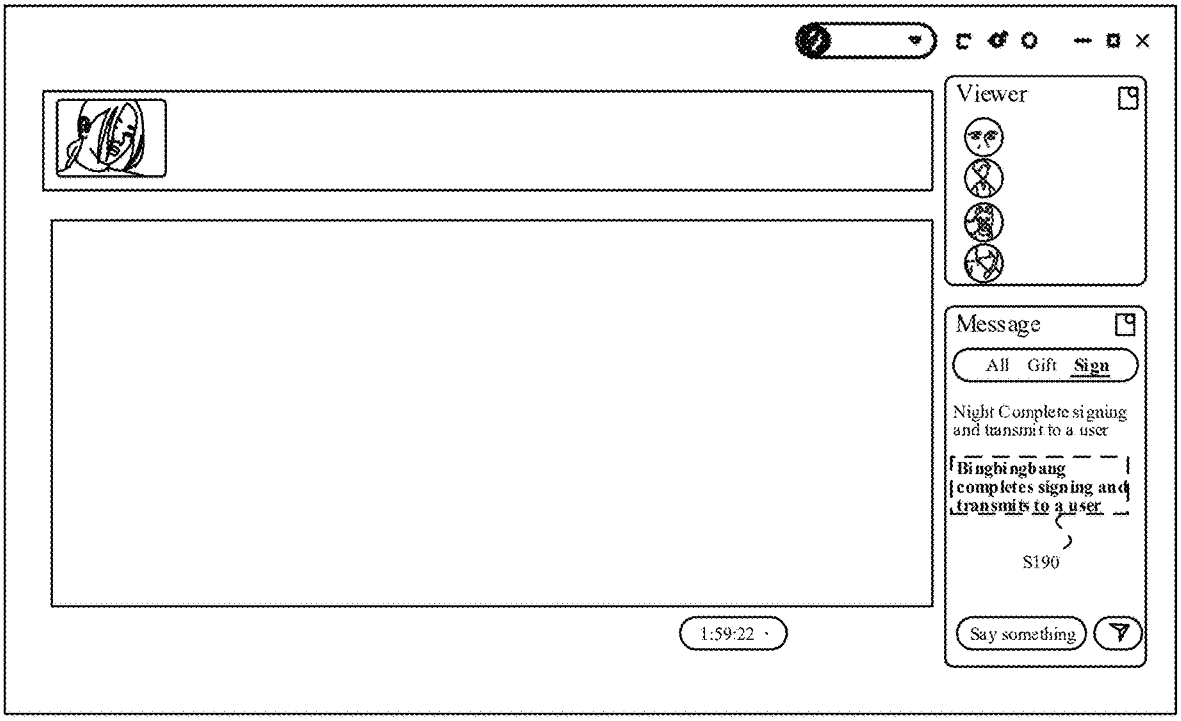
FIG. 19 is a schematic diagram of interaction feedback information according to an embodiment of the present disclosure.

FIG. 19 shows a schematic diagram of interaction feedback information according to an embodiment of the present disclosure. "A signature of Bingbingbang has been completed and transmitted to a user" shown in S190 is an example of the interaction feedback information in this embodiment of the present disclosure. The second object is informed that a signature invitation transmitted by the first object "Bingbingbang" is completed, and a signature result is transmitted to the first object "Bingbingbang".

The presentation forms and content of the interaction feedback information listed above are merely a simple example for description. This is not specifically limited in this specification.

Figure 20:
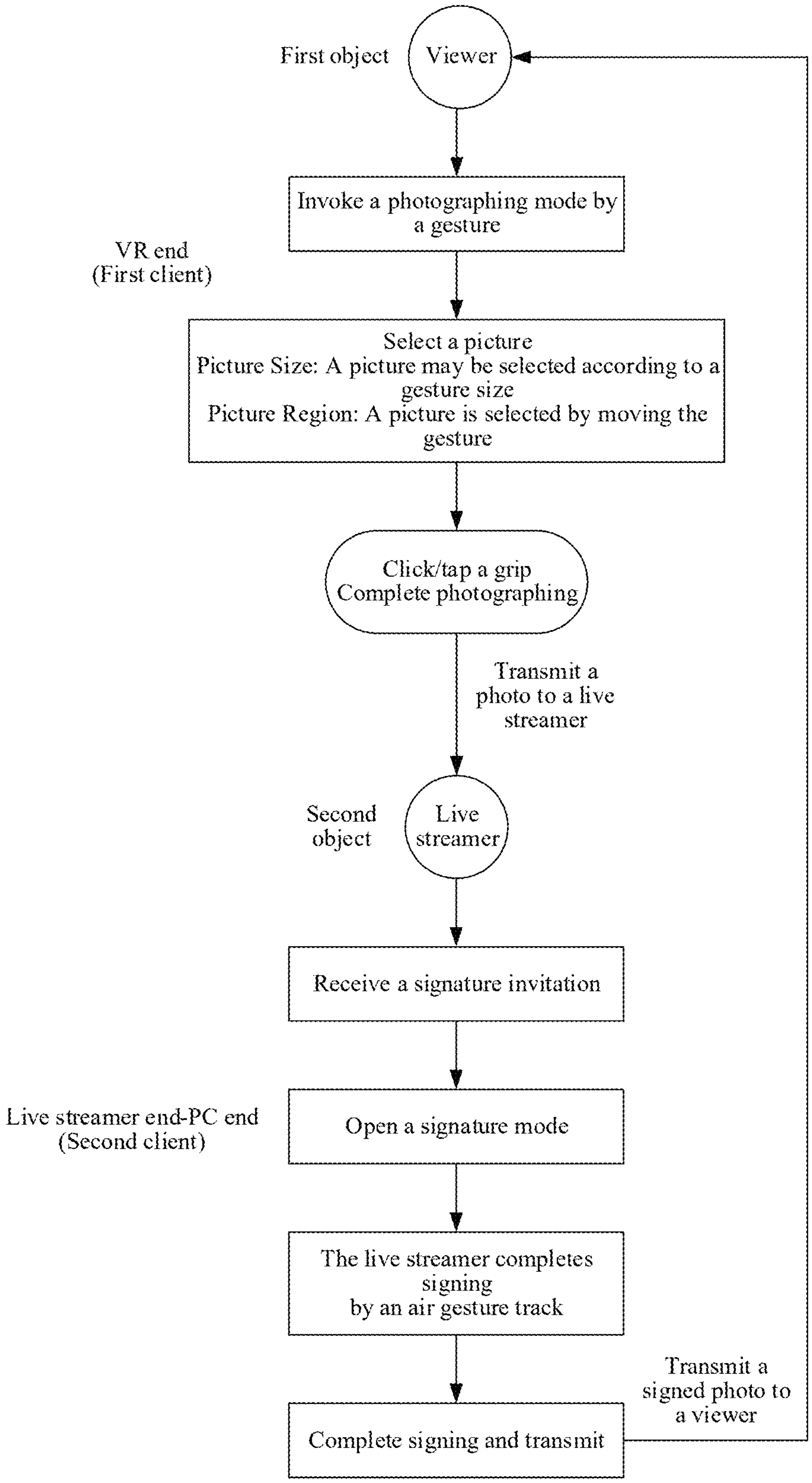
FIG. 20 is a schematic diagram of a procedure relationship between a VR end and a live streamer end according to an embodiment of the present disclosure.

An interaction process between a VR end and a live streamer end (PC) in this embodiment of the present disclosure is briefly summarized below by using a VR live streaming scene as an example:

FIG. 20 shows a schematic diagram of a procedure relationship between a VR end and a live streamer end according to an embodiment of the present disclosure.

An example in which a first object is a viewer and a second object is a live streamer hosting a live stream viewed by the viewer is used. In a VR live streaming scene, a first client used by the viewer is a VR client, briefly referred to as a VR end. Assuming that a second client used by the live streamer is a PC end, in the VR live streaming scene, a procedure relationship of signature interaction between the viewer and the live streamer is:

First, the viewer invokes a photographing mode of the VR end by using a gesture, and selects a picture. A picture size may be determined according to a gesture size of the viewer, and a picture region may be determined by moving the gesture by the viewer. After the picture size and the picture region are selected, the viewer clicks/taps a grip of the VR end, to complete photo shooting. Further, a shot photo (i.e. an interactive picture) is transmitted to the live streamer by using the VR end.

After receiving a signature invitation request, the live streamer may enable a signature mode, and complete signing by using an air gesture track. After completing signing, the live streamer may transmit a signed photo to the VR end of the viewer.

The procedure relationship shown in FIG. 20 is merely a simple example. For a specific implementation process, refer to the foregoing embodiment. Details are not described herein again.

In addition, in FIG. 20, an example in which the first object triggers the picture obtaining operation by using the preset photographing gesture and the second object performs signature interaction by using the first writing mode is used. In addition, other manners may be used. Furthermore, the first object may further perform secondary editing on a shot photo, and the like. For details, refer to the foregoing embodiment. Details are not described herein again.

In this embodiment of the present disclosure, the first object may be a viewer, and the second object is a live streamer of a live stream viewed by the first object. In addition, the first object and the second object may be viewers viewing a same live stream, and the like. This is not specifically limited in this embodiment of the present disclosure.

Figure 21:
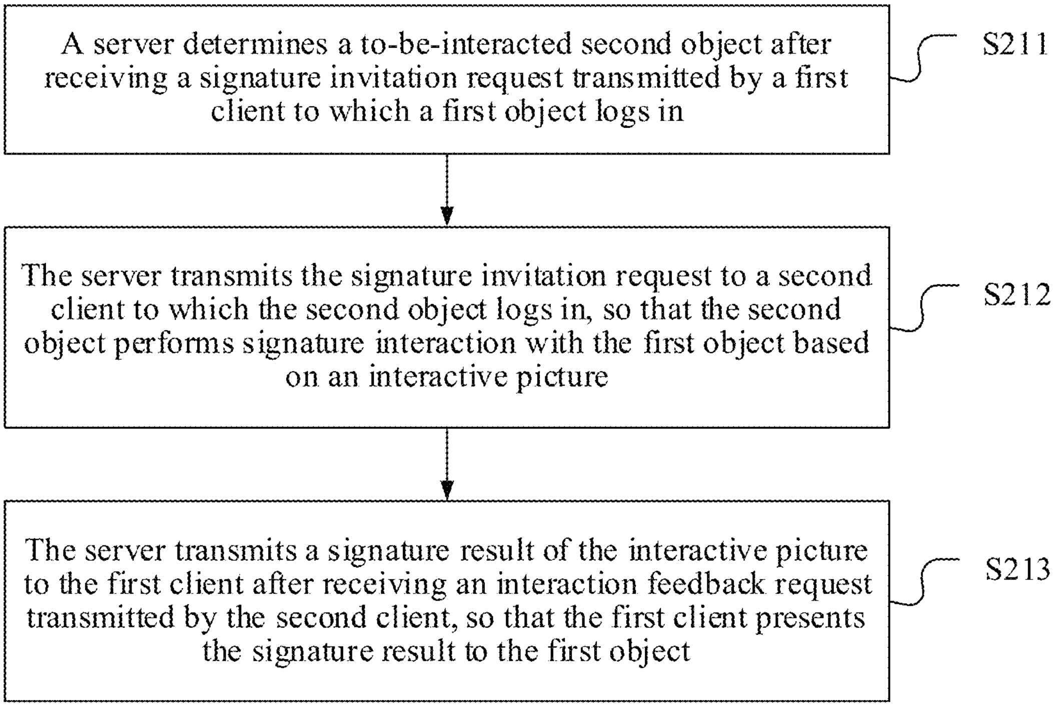
FIG. 21 is an implementation flowchart of a fourth live streaming interaction method according to an embodiment of the present disclosure.

FIG. 21 shows an implementation flowchart of a fourth live streaming interaction method according to an embodiment of the present disclosure. Taking a server as an execution subject as an example, a specific implementation procedure of the method includes:

S211: A server determines a to-be-interacted second object after receiving a signature invitation request transmitted by a first client to which a first object logs in.

The signature invitation request includes an interactive picture, and the interactive picture is generated based on a live streaming picture in a live streaming interface after the first object triggers a picture obtaining operation on the live streaming interface.

In this embodiment of the present disclosure, in the process of viewing a live stream, the first object may obtain, by using a picture obtaining operation, an interactive picture generated based on a live streaming interface, and initiate a signature invitation to the second object based on this. Specifically, a signature invitation request transmitted by the first object is transmitted to the server by using the first client. The server determines a requested party corresponding to the signature invitation request, namely a to-be-interacted second object, and then transmits the signature invitation request to a second client to which the second object logs in.

When the first client and the second client are live streaming clients, the server is a back-end server corresponding to the live streaming clients.

Figure 22:
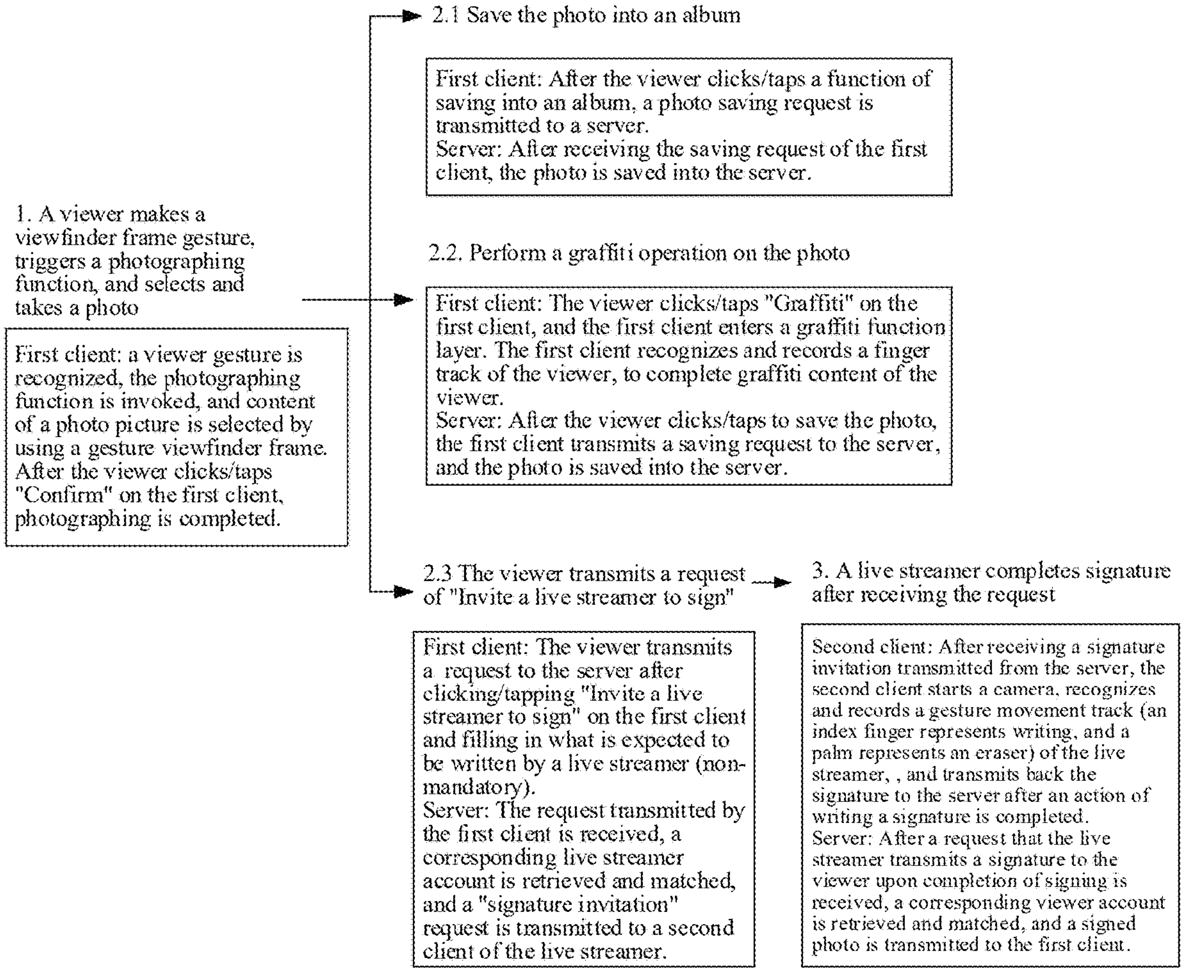
FIG. 22 is a procedure overview diagram corresponding to a front-end and back-end technology and interaction according to an embodiment of the present disclosure.

FIG. 22 shows a procedure overview diagram corresponding to a front-end and back-end technology and interaction according to an embodiment of the present disclosure. As shown in FIG. 22, a brief procedure includes:

1. A viewer makes a viewfinder frame gesture, triggers a photographing function, and selects and takes a photo.

Specifically, a first client recognizes the viewer's gesture, invokes the photographing function, and selects content of a photo picture by using a gesture viewfinder frame. After the viewer clicks/taps "Confirm" on the first client, photographing is completed.

2. After the photo is taken, the viewer may further edit the photo, and may specifically perform three operations on the photo: Save into an album, Graffiti, and Invite a live streamer to sign:

2.1 Save a photo into an album.

Specifically, on a first client side, after clicking/tapping the function of saving into an album, the viewer transmits a photo saving request to the server. On a server side, after receiving the saving request of the first client, a photo is saved into the server.

2.2. Perform a graffiti operation on a photo.

Specifically, on the first client side, the viewer clicks/taps "Graffiti" on the first client, and the first client enters a graffiti function layer. The first client recognizes and records a finger track of the viewer, to complete graffiti content of the viewer. On the server side, after the viewer clicks/taps to save the photo, the first client transmits a saving request to the server, and the photo is saved into the server.

2.3 The viewer transmits a request of "Invite a live streamer to sign".

Specifically, on the first client side, the viewer transmits a request, namely a signature invitation request, to the server after clicking/tapping "Invite a live streamer to sign" on the first client and filling in what is expected to be written by a live streamer (non-mandatory).

On the server side, the request transmitted by the first client is received, a corresponding live streamer account is retrieved and matched, and a "signature invitation" request is transmitted to a second client of the live streamer.

3. A live streamer completes signature after receiving the request.

Specifically, on the second client side, after receiving a signature invitation transmitted from the server, the second client starts a camera, recognizes and records a gesture movement track (an index finger represents writing, and a palm represents an eraser) of the live streamer, completes an action of writing a signature, and transmits back the signature to the server. The signature invitation transmitted from the server may be embodied via a signature invitation request.

On the server side, after a request that the live streamer transmits a signature to the viewer upon completion of signing is received, a corresponding viewer account is retrieved and matched, and a signed photo is transmitted to the first client. The request that the live streamer transmits a signature to the viewer upon completion of signing may be an interaction feedback request.

The procedure relationship shown in FIG. 22 is merely a simple example. For a specific implementation process, refer to the foregoing embodiment. Details are not described herein again.

S212: The server transmits the signature invitation request to a second client to which the second object logs in, so that the second object performs signature interaction with the first object based on an interactive picture.

S213: The server transmits a signature result of the interactive picture to the first client after receiving an interaction feedback request transmitted by the second client, so that the first client presents the signature result to the first object.

The signature result is generated by performing signature interaction based on the interactive picture. To be specific, the signature result is: an interactive picture including content signed by the second object. Specifically, the content signed by the second object may be specifically signed by the first object, for example, the first signature information listed above, or may be signed by the second object, for example, the second signature information listed above. This is not specifically limited in this specification. For example, FIG. 11 shows a schematic diagram of a signature result according to an embodiment of the present disclosure.

In this embodiment of the present disclosure, in a process of viewing a live stream, a first object may obtain an interactive picture generated based on a live streaming interface by using a picture obtaining operation. Based on this, a signature invitation request is initiated to a second client. Further, after receiving a signature invitation request, the second client triggers a signature interaction operation based on corresponding interaction prompt information, and performs signature interaction with the first object by using the interactive picture. After obtaining a signature result, the second object may return the signature result to the first client for viewing by triggering an interaction feedback operation, thereby implementing a closed-loop procedure of the signature interaction. A new live streaming room interaction form is provided, thereby enriching information interaction manners in a VR live streaming room, satisfying a personalized live streaming interaction requirement between objects, and improving interaction interestingness. In addition, the foregoing signature interaction is implemented in a live streaming process, thereby effectively reducing a frequency that an object logs in to and logs out of a live streaming room, and improving live streaming pressure on a server to some extent.

An interaction procedure of a signature interaction method according to an embodiment of the present disclosure is briefly described below from three sides: a first client, a second client, and a server.

Figure 23:
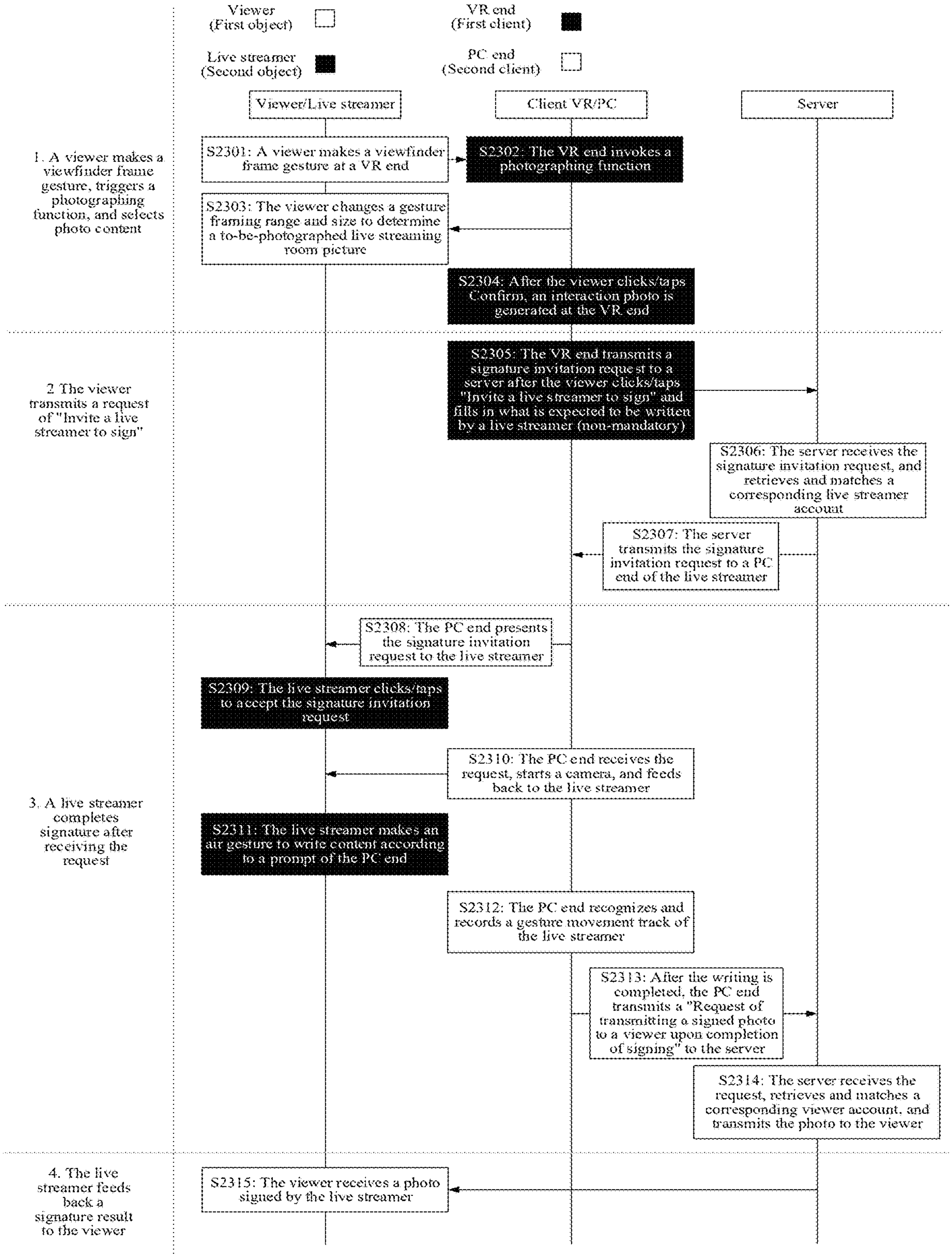
FIG. 23 is a schematic diagram of a specific interaction procedure of a signature interaction process according to an embodiment of the present disclosure.

FIG. 23 shows a schematic diagram of a specific interaction procedure of a signature interaction process according to an embodiment of the present disclosure.

A specific interaction procedure in which the viewer wears VR glasses, opens a live streaming application, uses a viewfinder gesture to take a photo in a live streaming room at a VR end, and transmits a signature invitation to a live streamer, and after completing signing, the live streamer transmits a signed photo to the VR end includes:

S2301: A viewer makes a viewfinder frame gesture at a VR end.

S2302: The VR end invokes a photographing function.

S2303: The viewer changes a gesture framing range and size to determine a to-be-photographed live streaming room picture.

S2304: After the viewer clicks/taps Confirm, an interaction photo is generated at the VR end.

S2301 to S2304 are a brief description of a process in which a first object photographs an interactive picture (i.e. the interaction photo). The viewer makes a viewfinder frame gesture, triggers the photographing function, and selects photo content.

Specifically, the viewer wears VR glasses, opens a live streaming application, and photographs a live streaming room picture by using the viewfinder frame gesture. After recognizing the gesture of the viewer, the VR end invokes the photographing function, and presents a photographing and view-finding state. Further, after changing the gesture framing range and size to determine the to-be-photographed live streaming room picture, the viewer may confirm photographing after pressing down a grip key and/or making a press-down action by using an index finger, and generate an interaction photo at the VR end.

For example, as shown in FIG. 4, after making a viewfinder frame gesture, the viewer may click/tap a photographing icon shown in S40, to photograph a selected live streaming room picture, to generate the interaction photo. For a specific implementation, refer to the foregoing embodiment. Details are not described herein again.

S2305: The VR end transmits a signature invitation request to a server after the viewer clicks/taps "Invite a live streamer to sign" and fills in what is expected to be written by a live streamer (non-mandatory).

S2306: The server receives the signature invitation request, and retrieves and matches a corresponding live streamer account.

S2307: The server transmits the signature invitation request to a PC end of the live streamer.

S2305 to S2307 are a brief description of a process in which the first object transmits the signature invitation request to the second object, and the viewer transmits the signature invitation request of "Invite a live streamer to sign". For example, as shown in FIG. 6, after obtaining the interaction photo, the viewer clicks/taps "Invite a live streamer to sign" shown in FIG. 6, to transmit a signature invitation request of "Invite a live streamer to sign" to the live streamer. For a specific implementation, refer to the foregoing embodiment. Details are not described herein again.

In this process, before transmitting the signature invitation request to the live streamer, the viewer may further perform a graffiti operation on the interactive picture, as shown in FIG. 8. In addition, when transmitting the signature invitation request to the live streamer, the viewer may further fill in what is expected to be said by the live streamer (i.e. signature information), and the like.

S2308: The PC end presents the signature invitation request to the live streamer.

S2309: The live streamer clicks/taps to accept the signature invitation request.

S2310: The PC end receives the request, starts a camera, and feeds back to the live streamer.

S2311: The live streamer makes an air gesture to write content according to a prompt of the PC end.

S2312: The PC end recognizes and records a gesture movement track of the live streamer.

S2313: After the writing is completed, the PC end transmits a "Request of transmitting a signed photo to a viewer upon completion of signing" to the server.

S2314: After receiving the request, the server retrieves and matches a corresponding viewer account, and transmits the photo to the viewer.

The request received by the server may be an interaction feedback request. S2308 to S2314 are a summary of a process of signing by the second object. The live streamer receives the signature invitation request and completes signing.

Specifically, the PC end presents a signature invitation request to the live streamer. As shown in S132 in FIG. 13, after the live streamer clicks S132 to accept the signature invitation request, the PC end starts the camera, and prompts the live streamer to complete writing content according to a gesture. The live streamer writes content by using an air gesture prompted by the PC end. The PC end recognizes and records a movement track of the gesture of the live streamer, and transmits a "Request of transmitting a signed photo to a viewer upon completion of signing" to the server after the writing is completed. For a specific implementation, refer to the foregoing embodiment. Details are not described herein again.

In this process, a first writing mode is used as an example. When a second object performs signing, the first writing mode may be used by default (or a second writing mode or another writing mode may be used by default, not specifically limited herein), and the second object may perform mode switching, and perform signing by using another writing mode. This is not specifically limited herein.

S2315: The viewer receives a photo signed by the live streamer.

Finally, the live streamer feeds back a signature result to the viewer. For example, FIG. 11 shows a schematic diagram of a photo signed by a live streamer according to an embodiment of the present disclosure.

The schematic diagram of an interaction procedure shown in FIG. 23 is only a simple example, and other related procedures are also applicable to this embodiment of the present disclosure. Details are not described herein again.

In this embodiment of the present disclosure, a photographing function is first triggered in a manner of a gesture viewfinder frame, to provide viewers with a more quiet and realistic photographing feeling. Then, a signature invitation is transmitted to a live streamer. After receiving the signature invitation, the live streamer clicks/taps to accept a signature invitation, and a photo appears to the live streamer. The live streamer directly writes, on the photo taken by the viewer in a manner of recognizing a gesture track of the live streamer, a signature and words to say to the viewer, and transmits the photo back to the viewer, thereby completing a closed loop of the entire procedure, and increasing interaction between the viewer and the live streamer.

Figure 24:
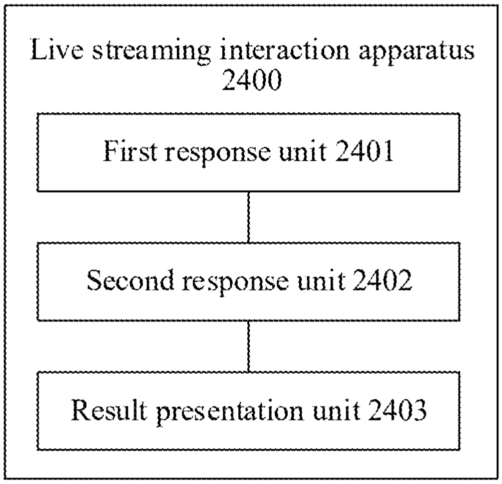
FIG. 24 is a schematic diagram of a composition structure of a first live streaming interaction apparatus according to an embodiment of the present application.

Based on a same inventive concept, an embodiment of the present disclosure further provides a live streaming interaction apparatus. FIG. 24 shows a schematic structural diagram of a first live streaming interaction apparatus 2400, which may include:

a first response unit 2401, configured to present, in response to a picture obtaining operation triggered by a first object on a live streaming interface, a corresponding interactive picture in the live streaming interface, where the interactive picture is generated based on a live streaming picture in the live streaming interface;

a second response unit 2402, configured to transmit the interactive picture to a second client via a signature invitation request in response to a signature invitation operation triggered by the first object based on the interactive picture, so that a second object logged into the second client performs signature interaction with the first object based on the interactive picture; and a result presentation unit 2403, configured to receive and present a signature result for the interactive picture, where the signature result is generated by performing signature interaction based on the interactive picture.

In some embodiments, when the live streaming interface is a virtual reality live streaming interface, the picture obtaining operation is a photographing operation, and the interactive picture is obtained by photographing the live streaming picture in the live streaming interface.

When the live streaming interface is a non-virtual reality live streaming interface, the picture obtaining operation is a screenshot operation, and the interactive picture is obtained by capturing the live streaming picture in the live streaming interface.

In some embodiments, when the picture obtaining operation is a photographing operation, the first response unit 2401 is specifically configured to:

determine that a preset photographing gesture of the first object is recognized, and determine, according to the preset photographing gesture, a picture size and a picture region that are set by the first object; and present an interactive picture determined based on the picture size and the picture region in the live streaming interface in response to the photographing operation triggered by the first object.

In some embodiments, the preset photographing gesture is a viewfinder frame gesture. The first response unit 2401 is specifically configured to:

determine the picture size according to a size of the viewfinder frame gesture; and select the picture region by moving the viewfinder frame gesture.

In some embodiments, the second response unit 2402 is further configured to:

before transmitting the interactive picture to a second client via a signature invitation request in response to a signature invitation operation triggered based on the interactive picture, edit the interactive picture correspondingly in response to an editing operation performed by the first object for the interactive picture, and present an edited interactive picture.

The second response unit 2402 is specifically configured to:

transmit the edited interactive picture to the second client by using the signature invitation request in response to a signature invitation operation triggered by the first object for the edited interactive picture.

In some embodiments, when the editing operation is a graffiti operation, the second response unit 2402 is specifically configured to:

obtain a gesture track of the first object on the interactive picture in response to a graffiti operation, triggered by the first object using a graffiti control, for the interactive picture; and recognize and present graffiti content painted by the first object on the interactive picture using the gesture track, to obtain the edited interactive picture.

In some embodiments, the second response unit 2402 is further configured to:

obtain, before transmitting the interactive picture to a second client via a signature invitation request, signature information inputted by the first object in response to an input operation triggered by the first object, where the signature information is information signed by the second object on the interactive picture after being requested by the first object.

The second response unit 2402 is specifically configured to:

transmit the interactive picture and the signature information to the second client by using the signature invitation request, so that the second object performs signature interaction with the first object based on the interactive picture and the signature information.

In some embodiments, the second response unit 2402 is specifically configured to:

present a confirmation interface in response to a signature invitation operation triggered by the first object using a signature control;

obtain the signature information inputted by the first object in response to an input operation triggered by the first object based on the confirmation interface; and transmit the interactive picture and the signature information to the second client in response to a confirmation operation triggered by the first object based on the confirmation interface.

In some embodiments, the second response unit 2402 is further configured to:

present, after transmitting the interactive picture to a second client via a signature invitation request in response to a signature invitation operation triggered by the first object based on the interactive picture, transmitting prompt information in the live streaming interface, where the transmitting prompt information indicates that a current signature invitation is successfully transmitted to the second client.

Figure 25:
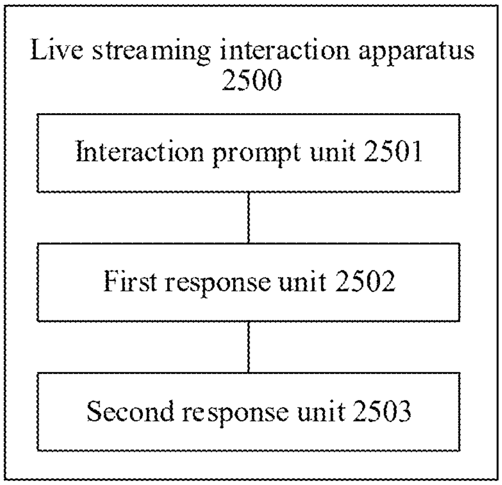
FIG. 25 is a schematic diagram of a composition structure of a second live streaming interaction apparatus according to an embodiment of the present application.

Based on a same inventive concept, an embodiment of the present disclosure further provides a live streaming interaction apparatus. FIG. 25 shows a schematic structural diagram of a second live streaming interaction apparatus 2500, which may include:

an interaction prompt unit 2501, configured to present corresponding interaction prompt information after receiving a signature invitation request transmitted by a first client for an interactive picture, where the interaction prompt information indicates that a first object initiates a signature interaction to a second object, and the interactive picture is generated based on a live streaming picture in a live streaming interface after the first object triggers a picture obtaining operation on the live streaming interface;

a first response unit 2502, configured to obtain a signature result generated based on the interactive picture in response to a signature interaction operation triggered by the second object based on the interaction prompt information; and a second response unit 2503, configured to return the signature result to the first client in response to an interaction feedback operation triggered by the second object.

In some embodiments, the first response unit 2502 is specifically configured to:

present a signature interface in response to the signature interaction operation triggered by the second object based on the interaction prompt information; and recognize and present content signed by the second object on the interactive picture using the signature interface, and obtain the signature result generated based on the interactive picture.

In addition, the second response unit 2503 is specifically configured to:

return the signature result to the first client in response to the interaction feedback operation triggered by the second object using a transmitting control in the signature interface.

In some embodiments, when signing is performed by using a first writing mode, the first response unit 2502 is specifically configured to:

start a camera, and present a signature interface in response to the signature interaction operation triggered by the second object based on the interaction prompt information, where the signature interface includes a gesture writing layer; and recognize and present, by using the camera, content signed by the second object on the gesture writing layer using a preset writing gesture.

In some embodiments, the preset writing gesture includes: a gesture for writing content, and a gesture for erasing content.

In some embodiments, when signing is performed by using a second writing mode, the first response unit 2502 is specifically configured to:

present a signature interface in response to the signature interaction operation triggered by the second object based on the interaction prompt information, where the signature interface displays the interactive picture; and obtain a gesture track of the second object on the signature interface, and recognize and present, by using the gesture track, content signed by the second object on the interactive picture.

In some embodiments, the first response unit 2502 is further configured to:

present a preview interface of the signature result in response to a preview operation triggered by using a preview control in the signature interface.

In some embodiments, the signature interface further includes: a mode switching control. The first response unit 2502 is further configured to:

switch a writing mode for signing in response to a mode switching operation triggered for the mode switching control.

In some embodiments, when the signature invitation request further includes signature information, the interaction prompt unit 2501 is specifically configured to:

present the interaction prompt information in a message region associated with the second object, where the interaction prompt information includes the signature information, and the signature information is information signed by the second object on the interactive picture after being requested by the first object.

In some embodiments, the signature information includes at least one of the following:

name information of the first object; and a persuasive language about requesting from the first object for signing by the second object.

In some embodiments, the second response unit 2503 is further configured to:

present, after returning the signature result to the first object, interaction feedback information in a message region associated with the second object, where the interaction feedback information indicates that the signature result of the interactive picture is successfully transmitted to the first object.

Figure 26:
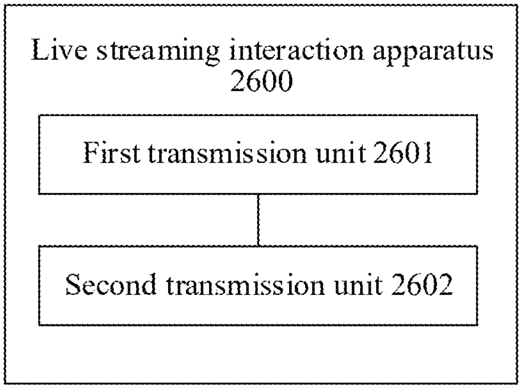
FIG. 26 is a schematic diagram of a composition structure of a third live streaming interaction apparatus according to an embodiment of the present application.

Based on a same inventive concept, an embodiment of the present disclosure further provides a live streaming interaction apparatus. FIG. 26 shows a schematic structural diagram of a third live streaming interaction apparatus 2600, which may include:

a first transmission unit 2601, configured to: determine a to-be-interacted second object after receiving a signature invitation request transmitted by a first client to which a first object logs in, where the signature invitation request includes an interactive picture, and the interactive picture is generated based on a live streaming picture in a live streaming interface after the first object triggers a picture obtaining operation on the live streaming interface; and transmit the signature invitation request to a second client to which the second object logs in, so that the second object performs signature interaction with the first object based on the interactive picture; and a second transmission unit 2602, configured to transmit a signature result of the interactive picture to the first client after receiving an interaction feedback request transmitted by the second client, so that the first client presents the signature result to the first object, where the signature result is generated by performing signature interaction based on the interactive picture.

In the present disclosure, in a process of viewing a live stream, a first object may obtain an interactive picture generated based on a live streaming interface by using a picture obtaining operation. Based on this, a signature invitation is initiated to a second client. Further, after receiving a signature invitation request, the second client triggers a signature interaction operation based on corresponding interaction prompt information, and performs signature interaction with the first object by using the interactive picture. After obtaining a signature result, the second object may return the signature result to the first client by triggering an interaction feedback operation, so that the first object views the signature result, thereby implementing a closed-loop procedure of the signature interaction. A new live streaming room interaction form is provided, thereby enriching information interaction manners in a VR live streaming room, satisfying a personalized live streaming interaction requirement between objects, and improving interaction interestingness. In addition, the foregoing signature interaction is implemented in a live streaming process, thereby effectively reducing a frequency that an object logs in to and logs out of a live streaming room, and improving live streaming pressure on a server to some extent.

For ease of description, the above parts fall into modules (or units) based on functions for separate description. Certainly, when the present disclosure is implemented, functions of the modules (or units) may be implemented in one or more pieces of software or hardware.

After the live streaming interaction method and apparatus according to exemplary embodiments of the present disclosure are introduced, next, an electronic device according to another exemplary embodiment of the present disclosure is introduced.

A person skilled in the art can understand that various aspects of the present disclosure may be implemented as a system, a method, or a program product. Therefore, various aspects of the present disclosure may be specifically implemented in the following forms, namely: hardware only implementations, software only implementations (including firmware, micro code, etc.), or implementations with a combination of software and hardware, which are collectively referred to as "circuit", "module", or "system" herein.

Based on a same inventive concept as the foregoing method embodiment, an electronic device is further provided in an embodiment of the present disclosure. In an embodiment, the electronic device may be a server, for example, the server 120 shown in FIG. 1. In this embodiment, a structure of the electronic device may be shown in FIG. 27. The electronic device includes a memory 2701, a communication module 2703, and one or more processors 2702.

The memory 2701 is configured to store a computer program executed by the processor 2702. The memory 2701 may mainly include a program storage region and a data storage region. The program storage region may store an operating system, a program required for running an instant messaging function, and the like. The data storage region may store various instant messaging information, operation instruction sets, and the like.

The memory 2701 may be a volatile memory, for example, a random-access memory (RAM). The memory 2701 may alternatively be a non-volatile memory, for example, a read-only memory, a flash memory, a hard disk drive (HDD), or a solid-state drive (SSD). Alternatively, the memory 2701 is any other medium capable of being configured to carry or store an expected computer program having an instruction or data structural form and being accessed by a computer, which is not limited herein. The memory 2701 may be a combination of the foregoing memories.

The processor 2702 may include one or more central processing units (CPU), or is a digital processing unit, or the like. The processor 2702 is configured to invoke the computer program stored in the memory 2701 to implement the foregoing live streaming interaction method.

The communication module 2703 is configured to communicate with a terminal device and other servers.

Figure 27:
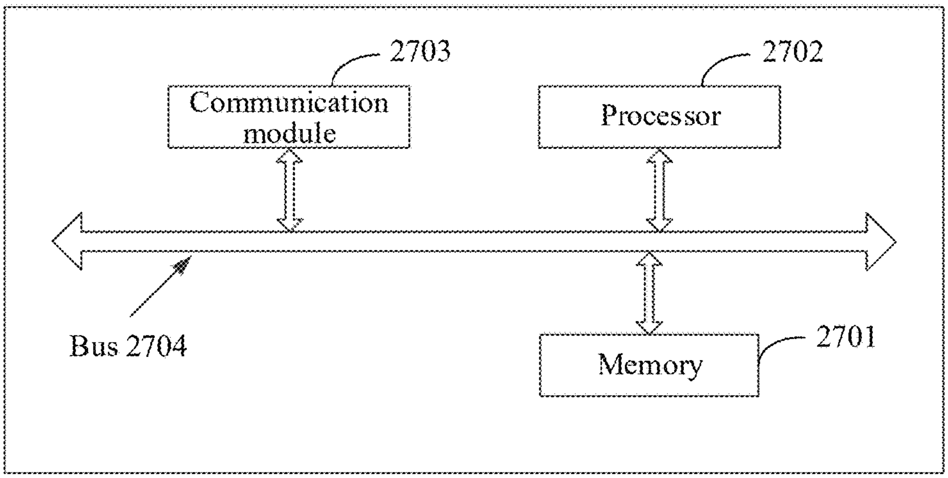
FIG. 27 is a schematic diagram of a composition structure of hardware to which an electronic device according to an embodiment of the present disclosure is applied.

A specific connection medium between the memory 2701, the communication module 2703, and the processor 2702 is not limited in this embodiment of the present disclosure. In this embodiment of the present disclosure, as shown in FIG. 27, the memory 2701 is connected to the processor 2702 via a bus 2704. The bus 2704 is indicated by a thick line in FIG. 27. The connection methods between other components are merely illustrative and are not intended to be limiting. The bus 2704 may be classified as an address bus, a data bus, a control bus, and the like. For ease of description, the bus in FIG. 27 is described by using only one bold line, but which does not describe that there is only one bus or one type of bus.

The memory 2701 has a computer storage medium stored therein. The computer storage medium has computer-executable instructions stored therein. The computer-executable instructions are configured for implementing the live streaming interaction method according to this embodiment of the present disclosure. The processor 2702 is configured to perform the foregoing live streaming interaction method, as shown in FIG. 21.

Figure 28:
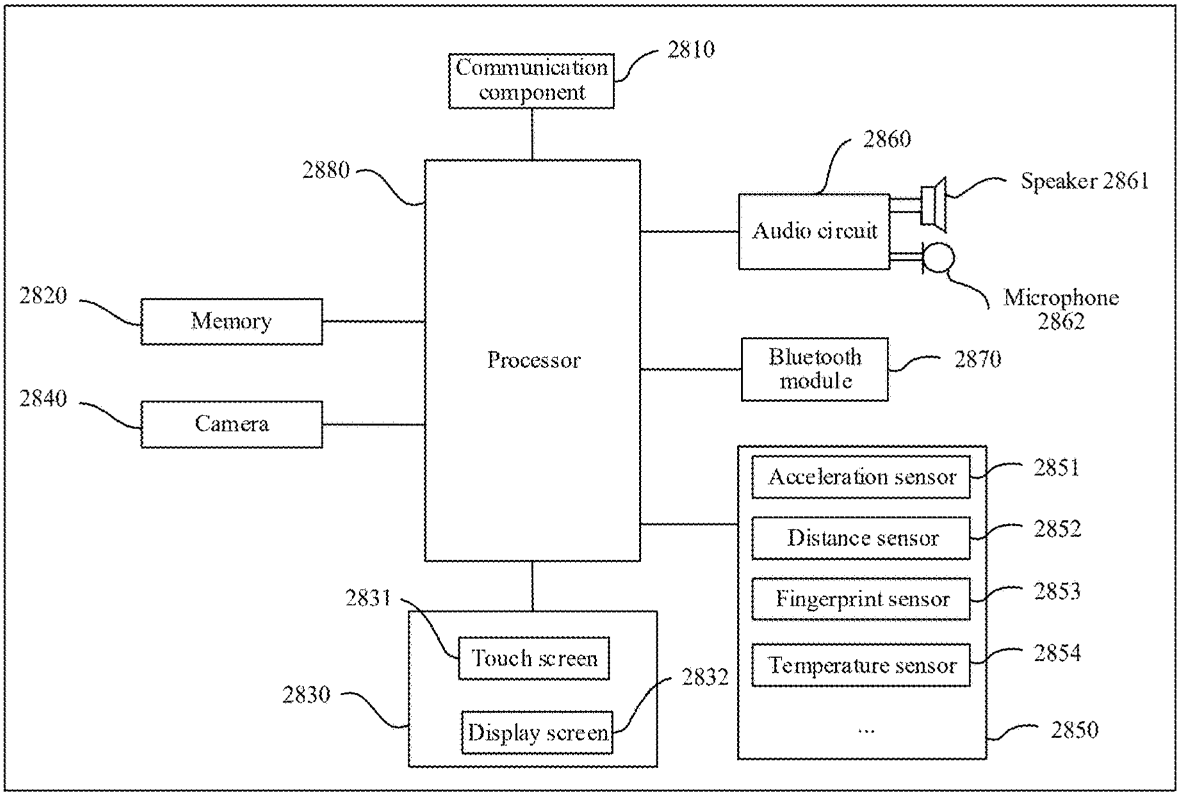
FIG. 28 is a schematic diagram of a composition structure of hardware to which another electronic device according to an embodiment of the present disclosure is applied.

In another embodiment, the electronic device may alternatively be another electronic device, such as the terminal device 110 shown in FIG. 1. In this embodiment, the structure of the electronic device may be shown in FIG. 28, including: components such as a communication component 2810, a memory 2820, a display unit 2830, a camera 2840, a sensor 2850, an audio circuit 2860, a Bluetooth module 2870, and a processor 2880.

The display unit 2830 may include a display screen 2832 disposed on a front surface of the terminal device 110. The display unit 2830 may be configured to display a live streaming interface, an interactive picture, a signature interface, a signature result, and the like in this embodiment of the present disclosure.

The display unit 2830 may further include a touch screen 2831 disposed on the front surface of the terminal device 110 and may collect touch operations of a user on or near the touch screen, for example, clicking/tapping an icon or dragging a scroll box.

The touch screen 2831 may cover the display screen 2832, or the touch screen 2831 and the display screen 2832 may be integrated to implement input and output functions of the terminal device 110. A component formed by integrating the touch screen and the display screen may be referred to as a touch display screen. In the present disclosure, the display unit 2830 may display an application and corresponding operations.

The terminal device may further include at least one sensor 2850, such as an acceleration sensor 2851, a distance sensor 2852, a fingerprint sensor 2853, and a temperature sensor 2854. The terminal device may further be configured with other sensors such as a gyroscope, a barometer, a hygrometer, a thermometer, an infrared sensor, an optical sensor, and a motion sensor.

The audio circuit 2860 may include a speaker 2861 and a microphone 2862.

The processor 2880 is a control center of the terminal device and is connected to various parts of the entire terminal using various interfaces and lines. Various functions and data processing of the terminal device are executed by running or executing a software program stored in the memory 2820 and invoking data stored in the memory 2820. In some embodiments, the processor 2880 may include one or more processing units. An application processor and a baseband processor may further be integrated into the processor 2880. The application processor mainly processes an operating system, a user interface, an application, and the like, and the baseband processor mainly processes wireless communication. The foregoing baseband processor may either not be integrated into the processor 2880. In the present disclosure, the processor 2880 may run an operating system, an application, a user interface display, a touch response, and the live streaming interaction method in this embodiment of the present disclosure. In addition, the processor 2880 is coupled to the display unit 2830.

The present disclosure has the following beneficial effects. The embodiments of the present disclosure provide a live streaming interaction method and apparatus, an electronic device, and a storage medium. In the present disclosure, in a process of viewing a live stream, a first object may obtain an interactive picture generated based on a live streaming interface by using a picture obtaining operation. Based on this, if the first object wants to invite a second object to perform signature interaction, the first object initiates a signature invitation request to a second client based on a signature invitation operation triggered by the interactive picture. Further, after receiving a signature invitation request, the second client triggers a signature interaction operation based on corresponding interaction prompt information, and performs signature interaction with the first object by using the interactive picture. After obtaining a signature result, the second object may return the signature result to the first object for viewing by triggering an interaction feedback operation, thereby implementing a closed-loop procedure of the signature interaction. The present disclosure provides a new live streaming room interaction form, thereby enriching information interaction manners in a VR live streaming room, satisfying a personalized live streaming interaction requirement between objects, and improving interaction interestingness. In addition, the foregoing signature interaction is implemented in a live streaming process, thereby effectively reducing a frequency that an object logs in to and logs out of a live streaming room, and improving live streaming pressure on a server to some extent.

In some embodiments, the aspects of the live streaming interaction method provided in the present disclosure are implemented in the form of a program product, which includes a computer program. When the program product runs an electronic device, the computer program is configured for causing the electronic device to perform the operations of the live streaming interaction method according to the foregoing exemplary embodiments of the present disclosure. For example, the electronic device may perform the operations shown in FIG. 2, FIG. 12, or FIG. 21.

The program product may be any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium include: an electrical connection having one or more wires, a portable disk, a hard disk, a random access memory (RAM), a read-only memory (ROM), an erasable programmable ROM (EPROM or a flash memory), an optical fiber, a portable compact disc ROM (CD-ROM), an optical storage device, a magnetic storage device, or any appropriate combination thereof.

The program product of the implementations of the present disclosure may adopt a portable CD-ROM and include a computer program, and may be run on the electronic device. However, the program product of the present disclosure is not limited thereto. In this specification, the readable storage medium may be any tangible medium that includes or stores a program. The program may be used by or in combination with a command execution system, apparatus, or device.

The readable signal medium may include a data signal being in a baseband or transmitted as a part of a carrier, and carries the readable computer program. A data signal propagated in such a way may assume a plurality of forms, including, but not limited to, an electromagnetic signal, an optical signal, or any appropriate combination thereof. The readable storage medium may alternatively be any readable medium other than a readable storage medium, and the readable storage medium may be used to transmit, propagate, or transfer a program used by or in combination with an instruction execution system, apparatus, or device.

The computer program configured to perform the operations of the present disclosure may be written in any combination of one or more programming languages. The programming languages include object-oriented programming languages such as Java and C++, and further include conventional procedural programming languages such as a "C" language or similar programming languages. The computer program may be completely executed on a user electronic device, partially executed on a user electronic device, executed as an independent software package, partially executed on a user electronic device and partially executed on a remote electronic device, or completely executed on a remote electronic device or server. In a case involving the remote electronic device, the remote electronic device may be connected to the user electronic device through any type of network including a local area network (LAN) or a wide area network (WAN), or may be connected to an external electronic device (for example, through the Internet using an Internet service provider).

Although several units or subunits of the apparatus have been mentioned in the detailed description above, such division is merely exemplary and not mandatory. Actually, according to the implementations of the present disclosure, the features and functions of two or more units described above may be specifically implemented in one unit. On the contrary, the features and functions of one unit described above may be further divided to be implemented by a plurality of units.

In addition, although the operations of the method in the present disclosure are described in a specific order in the accompanying drawings, this does not require or imply that these operations must be performed in the specific order, or all operations shown must be performed to achieve the expected result. Additionally or alternatively, some operations may be omitted, a plurality of operations may be combined into one operation for execution, and/or one operation may be decomposed into a plurality of operations for execution.

A person skilled in the art can understand that the embodiments of the present disclosure may be provided as a method, a system, or a computer program product. Therefore, the present disclosure may use a form of hardware-only embodiments, software-only embodiments, or embodiments combining software and hardware. In addition, the present disclosure may be in a form of a computer program product implemented on one or more computer-available storage media (including but not limited to a magnetic disk memory, a CD-ROM, an optical memory, and the like) including computer-available computer programs.

The present disclosure is described with reference to flowcharts and/or block diagrams of the method, the device (system), and the computer program product according to the embodiments of the present disclosure. Computer program instructions may implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner so that the instructions stored in the computer-readable memory generate an artifact that includes an instruction apparatus. The instruction apparatus implements functions specified in one or more procedures in the flowcharts and/or one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although exemplary embodiments of the present disclosure have been described, once persons skilled in the art know the basic creative concept, they can make additional changes and modifications to these embodiments. Therefore, the following claims are intended to be construed as to cover the exemplary embodiments and all changes and modifications falling within the scope of the present disclosure.

It is clear that a person skilled in the art can make various modifications and variations to the present disclosure without departing from the spirit and scope of the present disclosure. In this way, if the modifications and variations made to the present disclosure fall within the scope of the claims of the present disclosure and their equivalent technologies, the present disclosure is intended to include these modifications and variations.

What is claimed is:

1. A live streaming interaction method, performed by a first client, the method comprising:

presenting, in response to a picture obtaining operation triggered by a first object on a live streaming interface, a corresponding interactive picture in the live streaming interface, the interactive picture being generated based on a live streaming picture in the live streaming interface;

transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

2. The method according to claim 1, wherein when the live streaming interface is a virtual reality live streaming interface, the picture obtaining operation is a photographing operation, and the interactive picture is obtained by photographing the live streaming picture in the live streaming interface; and when the live streaming interface is a non-virtual reality live streaming interface, the picture obtaining operation is a screenshot operation, and the interactive picture is obtained by capturing the live streaming picture in the live streaming interface.

3. The method according to claim 2, wherein when the picture obtaining operation is the photographing operation, presenting, in response to the picture obtaining operation triggered by the first object on the live streaming interface, the corresponding interactive picture in the live streaming interface comprises:

determining that a preset photographing gesture of the first object is recognized, and determining, according to the preset photographing gesture, a picture size and a picture region that are set by the first object; and presenting an interactive picture determined based on the picture size and the picture region in the live streaming interface in response to the photographing operation triggered by the first object.

4. The method according to claim 3, wherein the preset photographing gesture is a viewfinder frame gesture; determining, according to the preset photographing gesture, the picture size and the picture region that are set by the first object comprises:

determining the picture size according to a size of the viewfinder frame gesture; and selecting the picture region by moving the viewfinder frame gesture.

5. The method according to claim 1, further comprising:

editing the interactive picture correspondingly in response to an editing operation performed by the first object for the interactive picture, and presenting an edited interactive picture, wherein transmitting the interactive picture to the second client via the signature invitation request in response to the signature invitation operation triggered by the first object based on the interactive picture comprises:

transmitting the edited interactive picture to the second client by using the signature invitation request in response to a signature invitation operation triggered by the first object for the edited interactive picture.

6. The method according to claim 5, wherein the editing operation is a graffiti operation, and editing the interactive picture correspondingly in response to the editing operation performed by the first object for the interactive picture, and presenting the edited interactive picture comprises:

obtaining a gesture track of the first object on the interactive picture in response to a graffiti operation, triggered by the first object using a graffiti control, for the interactive picture; and recognizing and presenting graffiti content painted by the first object on the interactive picture using the gesture track, to obtain the edited interactive picture.

7. The method according to claim 1, further comprising:

obtaining signature information inputted by the first object in response to an input operation triggered by the first object, the signature information being information signed by the second object on the interactive picture after being requested by the first object, wherein transmitting the interactive picture to the second client via the signature invitation request comprises:

transmitting the interactive picture and the signature information to the second client by using the signature invitation request, so that the second object performs signature interaction with the first object based on the interactive picture and the signature information.

8. The method according to claim 7, wherein responding to the signature invitation operation triggered based on the interactive picture comprises:

presenting a confirmation interface in response to a signature invitation operation triggered by the first object using a signature control;

obtaining signature information inputted by the first object in response to the input operation triggered by the first object comprises:

obtaining the signature information inputted by the first object in response to an input operation triggered by the first object based on the confirmation interface; and transmitting the interactive picture and the signature information to the second client via the signature invitation request comprises:

transmitting the interactive picture and the signature information to the second client in response to a confirmation operation triggered by the first object based on the confirmation interface.

9. The method according to claim 1, further comprising:

presenting transmitting prompt information in the live streaming interface, the transmitting prompt information indicating that the signature invitation request is successfully transmitted.

10. An electronic device, comprising:

one or more processors and a memory containing a computer program that, when being executed, causes the one or more processors to perform:

presenting, in response to a picture obtaining operation triggered by a first object on a live streaming interface, a corresponding interactive picture in the live streaming interface, the interactive picture being generated based on a live streaming picture in the live streaming interface;

transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

11. The device according to claim 10, wherein when the live streaming interface is a virtual reality live streaming interface, the picture obtaining operation is a photographing operation, and the interactive picture is obtained by photographing the live streaming picture in the live streaming interface; and when the live streaming interface is a non-virtual reality live streaming interface, the picture obtaining operation is a screenshot operation, and the interactive picture is obtained by capturing the live streaming picture in the live streaming interface.

12. The device according to claim 11, wherein when the picture obtaining operation is the photographing operation, the one or more processors are further configured to perform:

determining that a preset photographing gesture of the first object is recognized, and determining, according to the preset photographing gesture, a picture size and a picture region that are set by the first object; and presenting an interactive picture determined based on the picture size and the picture region in the live streaming interface in response to the photographing operation triggered by the first object.

13. The device according to claim 12, wherein the preset photographing gesture is a viewfinder frame gesture, and the one or more processors are further configured to perform:

determining the picture size according to a size of the viewfinder frame gesture; and selecting the picture region by moving the viewfinder frame gesture.

14. The device according to claim 10, wherein the one or more processors are further configured to perform:

editing the interactive picture correspondingly in response to an editing operation performed by the first object for the interactive picture, and presenting an edited interactive picture; and transmitting the edited interactive picture to the second client by using the signature invitation request in response to a signature invitation operation triggered by the first object for the edited interactive picture.

15. The device according to claim 14, wherein the editing operation is a graffiti operation, and the one or more processors are further configured to perform:

obtaining a gesture track of the first object on the interactive picture in response to a graffiti operation, triggered by the first object using a graffiti control, for the interactive picture; and recognizing and presenting graffiti content painted by the first object on the interactive picture using the gesture track, to obtain the edited interactive picture.

16. The device according to claim 10, wherein the one or more processors are further configured to perform:

obtaining signature information inputted by the first object in response to an input operation triggered by the first object, the signature information being information signed by the second object on the interactive picture after being requested by the first object; and transmitting the interactive picture and the signature information to the second client by using the signature invitation request, so that the second object performs signature interaction with the first object based on the interactive picture and the signature information.

17. The device according to claim 16, wherein the one or more processors are further configured to perform:

presenting a confirmation interface in response to a signature invitation operation triggered by the first object using a signature control;

obtaining the signature information inputted by the first object in response to an input operation triggered by the first object based on the confirmation interface; and transmitting the interactive picture and the signature information to the second client in response to a confirmation operation triggered by the first object based on the confirmation interface.

18. The device according to claim 10, wherein the one or more processors are further configured to perform:

presenting transmitting prompt information in the live streaming interface, the transmitting prompt information indicating that the signature invitation request is successfully transmitted.

19. A non-transitory computer-readable storage medium, comprising a computer program that, when being executed, causes at least one processor to perform:

presenting, in response to a picture obtaining operation triggered by a first object on a live streaming interface, a corresponding interactive picture in the live streaming interface, the interactive picture being generated based on a live streaming picture in the live streaming interface;

transmitting the interactive picture to a second client via a signature invitation request in response to a signature invitation operation triggered by the first object based on the interactive picture, so that a second object logged into the second client performs signature interaction with the first object based on the interactive picture; and receiving and presenting a signature result for the interactive picture, the signature result being generated through the signature interaction based on the interactive picture.

20. The storage medium according to claim 19, wherein when the live streaming interface is a virtual reality live streaming interface, the picture obtaining operation is a photographing operation, and the interactive picture is obtained by photographing the live streaming picture in the live streaming interface; and when the live streaming interface is a non-virtual reality live streaming interface, the picture obtaining operation is a screenshot operation, and the interactive picture is obtained by capturing the live streaming picture in the live streaming interface.

* * * * *